United States Patent
Rykov et al.

(10) Patent No.: US 12,100,221 B2
(45) Date of Patent: Sep. 24, 2024

(54) METHODS AND ELECTRONIC DEVICES FOR DETECTING OBJECTS IN SURROUNDINGS OF A SELF-DRIVING CAR

(71) Applicant: YANDEX SELF DRIVING GROUP LLC, Moscow (RU)

(72) Inventors: Andrey Olegovich Rykov, Snezhinsk (RU); Artem Andreevich Filatov, Perm (RU)

(73) Assignee: Y.E. Hub Armenia LLC, Yerevan (AM)

( * ) Notice: Subject to any disclaimer, the term of this patent is extended or adjusted under 35 U.S.C. 154(b) by 360 days.

(21) Appl. No.: 17/585,272

(22) Filed: Jan. 26, 2022

(65) Prior Publication Data

US 2022/0309794 A1 Sep. 29, 2022

(30) Foreign Application Priority Data

Mar. 26, 2021 (RU) .......................... RU2021108149

(51) Int. Cl.
*G06V 20/56* (2022.01)
*G06T 7/10* (2017.01)
(Continued)

(52) U.S. Cl.
CPC ................ *G06V 20/56* (2022.01); *G06T 7/10* (2017.01); *G06T 7/73* (2017.01); *G06V 10/761* (2022.01);
(Continued)

(58) Field of Classification Search
CPC ........ G06V 20/58; G06V 10/25; G06V 20/64; G06V 20/56; G06V 10/762; G06V 10/82;
(Continued)

(56) References Cited

U.S. PATENT DOCUMENTS 10,108,867 B1 * 10/2018 Vallespi-Gonzalez ...................... G06V 20/58
10,408,939 B1 * 9/2019 Kim ........................ G01S 17/89
(Continued)

FOREIGN PATENT DOCUMENTS

CN 110832348 A 2/2020
CN 116994332 A * 11/2023
(Continued)

OTHER PUBLICATIONS

Y. Li et al., "Deep Learning for LiDAR Point Clouds in Autonomous Driving: A Review," in IEEE Transactions on Neural Networks and Learning Systems, vol. 32, No. 8, pp. 3412-3432, Aug. 2021, doi: 10.1109/TNNLS.2020.3015992. (Year: 2020).*
(Continued)

*Primary Examiner* — Michael Robert Cammarata
(74) *Attorney, Agent, or Firm* — BCF LLP

(57) ABSTRACT

A method and electronic device for detecting an object are disclosed. The method includes generating a cluster of points representative of the surroundings of the SDC, generating by a first Neural Network (NN) a first feature vector based on the cluster indicative of a local context of the given object in the surroundings of the SDC, generating by a second NN second feature vectors for respective points from the cluster based on a portion of the point cloud, where a given second feature vector is indicative of the local and global context of the given object, generating by the first NN a third feature vector for the given object based on the second feature vectors representative of the given object, and generating by a third NN a bounding box around the given object using the third feature vector.

20 Claims, 10 Drawing Sheets

(51) Int. Cl.
 *G06T 7/73* (2017.01)
 *G06V 10/74* (2022.01)
 *G06V 10/762* (2022.01)
 *G06V 10/82* (2022.01)

(52) U.S. Cl.
 CPC ............ *G06V 10/762* (2022.01); *G06V 10/82* (2022.01); *G06T 2207/10028* (2013.01); *G06T 2207/30252* (2013.01)

(58) Field of Classification Search
 CPC . G06V 10/80; G06T 2207/30252; G06T 7/10; G06T 2207/10028; G06F 18/23
 See application file for complete search history.

(56) References Cited

U.S. PATENT DOCUMENTS

| | | | |
|---|---|---|---|
| 10,453,249 B2 * | 10/2019 | Smirnov | G06T 7/77 |
| 10,606,270 B2 | 3/2020 | Englard et al. | |
| 10,816,993 B1 | 10/2020 | Tran | |
| 10,970,518 B1 * | 4/2021 | Zhou | G06T 7/73 |
| 11,216,673 B2 * | 1/2022 | Behrendt | B60W 10/18 |
| 2018/0364717 A1 * | 12/2018 | Douillard | G06T 7/187 |
| 2019/0096086 A1 * | 3/2019 | Xu | G06V 20/647 |
| 2019/0180467 A1 | 6/2019 | Li et al. | |
| 2019/0287254 A1 * | 9/2019 | Lakshmi Narayanan | G06T 5/50 |
| 2019/0332118 A1 * | 10/2019 | Wang | G05D 1/0221 |
| 2020/0017117 A1 | 1/2020 | Milton | |
| 2020/0082560 A1 | 3/2020 | Nezhadarya et al. | |
| 2020/0090352 A1 * | 3/2020 | Murashkin | G05D 1/0248 |
| 2020/0294257 A1 * | 9/2020 | Yoo | G06F 18/25 |
| 2020/0377105 A1 * | 12/2020 | Murashkin | B60W 40/04 |
| 2021/0124901 A1 * | 4/2021 | Liu | G06V 20/13 |
| 2021/0150230 A1 * | 5/2021 | Smolyanskiy | G06V 20/56 |
| 2021/0263525 A1 * | 8/2021 | Das | G06N 3/084 |
| 2021/0343022 A1 * | 11/2021 | Cohen | G01S 13/865 |
| 2021/0374453 A1 * | 12/2021 | Kuo | G06T 7/10 |
| 2022/0180117 A1 * | 6/2022 | Chiu | G06N 3/08 |
| 2022/0292296 A1 * | 9/2022 | Hieida | G01S 13/931 |
| 2023/0213643 A1 * | 7/2023 | Hwang | G06T 7/50 382/106 |

FOREIGN PATENT DOCUMENTS

| | | | |
|---|---|---|---|
| JP | 2017117357 A | 6/2017 | |
| RU | 2744012 C1 | 3/2021 | |
| WO | WO-2019060125 A1 * | 3/2019 | G01S 13/867 |

OTHER PUBLICATIONS

C. R. Qi, W. Liu, C. Wu, H. Su, and L. J. Guibas, "Frustum pointnets for 3d object detection from rgb-d data," in Proceedings of the IEEE Conference on Computer Vision and Pattern Recognition, pp. 918-927, 2018. (Year: 2018).*

X. Xu, L. Zhang, J. Yang, C. Cao, Z. Tan and M. Luo, "Object Detection Based on Fusion of Sparse Point Cloud and Image Information," in IEEE Transactions on Instrumentation and Measurement, vol. 70, pp. 1-12, 2021, Art No. 2512412, doi: 10.1109/TIM.2021.3102739. (Year: 2021).*

X. Chen, H. Ma, J. Wan, B. Li, and T. Xia. Multi-view 3d object detection network for autonomous driving. In IEEE CVPR, 2017 (Year: 2017).*

Katare, Dewant, and Mohamed El-Sharkawy. "Real-time 3-d segmentation on an autonomous embedded system: using point cloud and camera." 2019 IEEE National Aerospace and Electronics Conference (NAECON). IEEE, 2019. (Year: 2019).*

X. Kong, G. Zhai, B. Zhong and Y. Liu, "PASS3D: Precise and Accelerated Semantic Segmentation for 3D Point Cloud," 2019 IEEE/RSJ International Conference on Intelligent Robots and Systems (IROS), Macau, China, 2019, pp. 3467-3473, doi: 10.1109/IROS40897.2019.8968296. (Year: 2019).*

Meyer et al. "LaserNet: An Efficient Probabilistic 3D Object Detector for Autonomous Driving", Conference Paper; 2019 IEEE/CVF Conference on Computer Vision and Pattern Recognition (CVPR); Mar. 20, 2019 https://arxiv.org/pdf/1903.08701.pdf. DOI:10.1109/CVPR.2019.01296.

Meyer et al. "Sensor Fusion for Joint 3D Object Detection and Semantic Segmentation", Conference: 2019 IEEE/CVF Conference on Computer Vision and Pattern Recognition Workshops (CVPRW); Conference Paper; Apr. 25, 2019 https://arxiv.org/pdf/1904.11466.pdf. DOI:10.1109/CVPRW.2019.00162.

Qi et al. "PointNet: Deep Learning on Point Sets for 3D Classification and Segmentation", Stanford University, Apr. 10, 2017 https://arxiv.org/pdf/1612.00593.pdf.

Vaswani et al. "Attention is all you need", Dec. 6, 2017 https://arxiv.org/pdf/1706.03762.pdf.

Gao et al. "VectorNet: Encoding HD Maps and Agent Dynamics from Vectorized Representation", May 8, 2020 https://arxiv.org/pdf/2005.04259.pdf.

Russian Search Report dated Jan. 24, 2022 issued in respect of the counterpart Russian Patent Application No. RU 2021108149.

Qingdong et al., "SVGA-Net: Sparse Voxel-Graph Attention Network for 3D Object Detection from Point Clouds", Published on Jun. 7, 2020, arXiv.org, Cornell University Library.

Sumyeong et al., "Robust 3-Dimension Point Cloud Mapping in Dynamic Environment Using Point-Wise Static Probability-Based NDT Scan-Matching", Published on Sep. 21, 2020, IEEE Access, vol. 8, 2020, DOI: 10.1109/ACCESS.2020.3025537, retrieved on Oct. 1, 2020.

The Extended European Search Report issued on Jul. 13, 2022 in respect of the European Patent Application EP22154044.6.

* cited by examiner

METHODS AND ELECTRONIC DEVICES FOR DETECTING OBJECTS IN SURROUNDINGS OF A SELF-DRIVING CAR

CROSS-REFERENCE

The present application claims priority to Russian Patent Application No. 2021108149, entitled "Methods and Electronic Devices for Detecting Objects in Surroundings of a Self-Driving Car", filed Mar. 26, 2021, the entirety of which is incorporated herein by reference.

TECHNICAL FIELD

The present technology relates generally to Self-Driving Cars (SDCs); and in particular, to electronic devices for and methods of detecting objects in the surroundings of an SDC.

BACKGROUND

Self-Driving Cars (SDCs) are vehicles that are able to autonomously drive themselves through private and/or public spaces. Using a system of sensors that detect the location and/or surroundings of the SDC, logic within or associated with the SDC controls the speed, propulsion, braking, and steering of the SDC based on the sensor-detected location and surroundings of the SDC. For example, a computer system can leverage sensor data for generating future trajectories for the SDC on a road segment and can control operation of the SDC so that it follows a selected trajectory on the road segment.

One of the main technical challenges in implementing the above systems is the ability for the computer system to detect an object present around the vehicle—such as the vehicle in front of the present vehicle (the present vehicle having the computer system onboard), which vehicle in front may pose a risk/danger to the present vehicle and may require the computer system to take a corrective measure, be it braking or otherwise changing speed, stopping or changing lanes. On a more granular level, the challenge of the object detection is not just the binary detection (presence or absence of the object), but the speed and accuracy associated with such an analysis and determination (especially avoiding "false negatives", whereby the system does not identify an object which is indeed present in front or around the vehicle).

The acuteness of this problem is illustrated by the following hypothetical scenario. Imagine that the self-driving or partially-autonomous vehicle is driving along the route. A child (or an adult, a pet, and the like) runs in front of the vehicle. It is imperative that the computer system controlling the vehicle detects the presence of the object fast and take corrective actions to avoid the collision. Naturally, the faster the computer system detects the presence of the object, the more time the computer system will have to determine the corrective action and to command the vehicle to execute the corrective action.

Typically, the SDC has a plurality of sensors to enable the SDC to capture and "understand" its surround area. A variety of sensor systems may be used by the SDC, such as but not limited to camera systems, radar systems, and LIDAR systems. Different sensor systems may be employed for capturing different information, and/or in different format, about the location and the surroundings of the SDC. For example, camera systems may be used for capturing image data about the surroundings of the SDC. In another example, LIDAR systems may be used to capture point cloud data for building 3D map representations of the surroundings and other potential objects located in proximity to the SDC.

It is generally known for the SDC to process data captured by such the plurality of sensors to generate a prediction, typically using a Machine Learning Algorithm (MLA) in regard to presence of one or more objects in the vicinity of the SDC. Such the prediction can then be used by the SDC to determine the most optimal current maneuver, be it to continue driving, stop, change direction, accelerate, or the like.

US Patent Publication 2020/082560 discloses a bounding box estimator that, upon receiving a set of two-dimensional data points representing an object in an environment, estimates a bounding box vector representative of a two-dimensional version of the object that is represented by the two-dimensional data points.

SUMMARY

Therefore, there is a need for systems and methods which avoid, reduce or overcome the limitations of the prior art. At least some aspects of the present technology are directed to ameliorating at least some technical problems associated with prior art solutions.

Developers of the present technology have devised methods and electronic devices for performing computer-implemented detection of objects in the surroundings of a "Self Driving Car" (SDC). It should be noted that computer systems are configured to generate a "bounding box" for detecting objects and which can be used for inter alia trajectory planning and safe vehicle operation.

In some embodiments of the present technology, there is provided an electronic device configured to generate a bounding box for an object represented via a "feature vector" or an "embedding". The feature vector representative of a given object is generated based on data generated by one or more sensor systems mounted onto the SDC. Sensor data may be collected, transmitted, and stored by the electronic device for extracting information about the surroundings of the SDC via one or more Neural Networks (NN). In at least some embodiments of the present technology, the electronic device may be configured to use one or more Convolutional NN (CNN) for generating the feature vector representative of the object. As is known, NNs are a class of Machine Learning Algorithms (MLAs) that, initially, can be trained to adjust weights or biases of the given NN until an overall loss function is optimized and later, in use, may be employed to generate predicted data.

Developers of the present technology have devised methods and electronic devices that allow generating a feature vector that is indicative of both a "local context" of the object, i.e. geometry of the object itself and of a "global context" of the object, i.e. other objects potentially present in the surroundings of the SDC.

The electronic device is configured to employ a first NN for generating a first feature vector from a cluster of points of a point cloud generated, for example, by a LiDAR system, associated with the object and which first feature vector is indicative of the local context of the object in the surroundings of the SDC. For example, a LIDAR system may be configured to generate a point cloud that is a 3D representation of the surroundings of the SDC.

It can be said that the local context is a function computed based on points from the cluster and which describes the geometry of a given object (associated with a cluster), and hence provides "local" information about the object. In at least some embodiments of the present technology, the local context may be representative of a geometry of the given object in the surroundings of the SDC. The first NN may be implemented in a manner generally known from aspects disclosed in "*PointNet: Deep Learning on Point Sets for 3D Classification and Segmentation*" authored by Charles R. Qi, Hao Su, Kaichun Mo, and Leonidas J. Guibas from Stanford University, and published on 10 Apr. 2017, the contents of which is incorporated herein by reference in its entirety. PointNet code may be found at github.com/charlesq34/pointnet.

In the context of the present technology, the electronic device is configured to add the first feature vector indicative of the local context of the object to the point information associated with each respective point from the cluster. It can be said that the points of the cluster, in the point cloud, may be augmented with additional information indicative of the local context of its neighbors in that cluster.

The electronic device is configured to employ a second NN on this point cloud with an augmented cluster for generating second feature vectors for respective points from the augmented cluster. It is contemplated that this second NN may be implemented as a CNN. Broadly speaking, CNNs are regularized "versions" of Multi-Layer Perceptrons (MLPs). MLPs usually refer to fully connected networks, that is, each neuron in one layer is connected to all neurons in the next layer. Hence, such NNs are referred to as "fully-connected" NNs. Typical ways for performing regularization includes adding some form of magnitude measurement of weights to the loss function. CNNs take a different approach towards regularization: they take advantage of the hierarchical pattern in data and assemble more complex patterns using smaller and simpler patterns.

It should be noted that the CNN has a receptive field. In the CNN, each neuron receives input from some number of locations in the previous layer. In a fully connected layer, each neuron receives input from every neuron of the previous layer. In a convolutional layer, each neuron receives input from only a restricted area of the previous layer called the neuron's receptive field. Thus in each convolutional layer, each neuron takes input from a larger area of points in the input cloud than previous layers. This is due to applying the convolution over and over, which takes into account the values of a point and its neighboring points.

In at least some embodiments of the present technology, the receptive field of the CNN may be of a size that allows to capture at least a portion of the point cloud including the augmented cluster and other points from the point cloud that are in proximity to the augmented cluster. It is contemplated that the portion of the point cloud excludes points from the point cloud that are outside the receptive field of the CNN.

The CNN may be configured to generate a second feature vector for a respective point of the portion of the point cloud by, in a sense, "looking" at point information of neighboring points in the portion. As a result, the second feature vector of a given point from the augmented cluster is based on the respective first feature vector indicative of the local context of the object and is now augmented with information indicative of a "global" context of the object in the surroundings of the SDC. It can be said that the global context is a function computed based on points from the augmented cluster and other neighboring points from the point cloud and which describes features of points near the cluster and/or a geometry of potential objects near the cluster and/or a difference in features between the neighboring points and the points from the augmented cluster, and hence provides "global" information about the object in the surroundings of the SDC.

In the context of the present technology, the electronic device is configured to add the second feature vector indicative of both the local context of the object and the global context of the object in the surroundings of the SDC to the point information associated with each respective point from the cluster. It can be said that the points of the cluster in the point cloud may be "augmented" with information indicative of both the local context about its neighbors inside that cluster and the global context about its neighbors outside that cluster.

The electronic device is configured to employ (again) the first NN on this so-augmented cluster for generating a third feature vector. In some embodiments of the present technology, the third feature vector may be used as the feature vector or the embedding representative of the object in the surroundings of the SDC. In some embodiments, it can be said that the first NN can generate an embedding representative of the object in the surroundings of the SDC. In these embodiments, the third feature vector may be used for generating a bounding box by a third NN or a "bounding box generator".

In other embodiments of the present technology, however, the electronic device may be configured to employ the third feature vector in a similar manner to how the first feature vector is employed by the electronic device for adding information to points from the cluster. In these embodiments, it is contemplated that the electronic device may be configured to employ the first NN and a second NN in a "looping configuration" and perform a pre-determined number of iterations where points from the cluster are iteratively augmented with local and global contexts of the object in the surroundings of the SDC.

The pre-determined number of iterations may be selected by an operator of the electronic device based on real-time computational resource limits and/or for computational speed limits. Developers of the present technology have realized that devising a system where local and global contexts are iteratively added to the point information during respective in-use phases of the first NN and the second NN may generate the feature vector for the object that may lead to an increase in the accuracy of bounding boxes generated by the third NN. In some embodiments, it is contemplated that distinct first NNs and distinct second NNs may be used during two sequential iterations. Also, a single iteration may consist of the electronic device employing a staggered combination of first NNs and second NNs, without departing from the scope of the present technology.

The developers of the present technology have realized that so-generating feature vectors representative of local and global contexts of a given object in the surroundings of the SDC may also be employed for other purposes during operation of the SDC. In some embodiments, the developers of the present technology have devised systems and methods for employing so-generated feature vectors for object tracking, trajectory estimation and/or collision risk management. Without wishing to be bound to any specific theory, the developers of the present technology have realized that so-generated feature vectors for a given object at different moments in time tend to be similar. As such, developers of the present technology have devised methods and systems that are able to (i) generate a given feature vector for a first object at a first moment in time, (ii) generate an other given feature vector for a second object at a second moment in time, (iii) generate a similarity factor by comparing the given and the other given feature vector, and (iv) in response to the similarity factor being above a pre-determined threshold, determine that the first object and the second object are the same object at different moments in time. Such tracking of objects at different moments in time may allow the electronic device to generate kinematic data about the movement of neighboring objects relative to the SDC.

The developers of the present technology have also realized that, in some cases, one or more points from the point cloud and which are associated with a given object may be excluded from a respective cluster of points. In such cases, the electronic device may be configured to, after generating bounding box data for the given object, identify at least one outlier point in the point cloud (i.e., at least one point belonging to the given object and that is excluded from the cluster) and generate a modified bounding box for the given object based on the bounding box and the at least one outlier point.

In a first broad aspect of the present technology, there is provided a method of detecting an object in a surrounding of a SDC. A LIDAR system is mounted onto the SDC and is communicatively coupled to an electronic device. The method is executable by the electronic device. The method comprises generating, by the electronic device, a cluster of points from a point cloud. The point cloud is representative of the surroundings of the SDC. Each point in the cluster is associated with a given object. The method comprises generating, by the electronic device using a first Neural Network (NN), a first feature vector based on the cluster. The first feature vector is associated with each point from the cluster and is indicative of a local context of the given object in the surroundings of the SDC. The method comprises generating, by the electronic device using a second NN, second feature vectors for respective points from the cluster based on a portion of the point cloud. The portion includes the points from the cluster and other points from the point cloud that are in proximity to the cluster. A given second feature vector of the respective point from the cluster is indicative of the local context of the given object in the surroundings of the SDC and of a global context of the given object in the surroundings of the SDC. The method comprises generating, by the electronic device using the first NN, a third feature vector for the given object based on the second feature vectors of the cluster. The third feature vector is representative of the given object in the surroundings of the SDC and is indicative of both the local and global context of the object in the surroundings of the SDC. The method comprises generating, by the electronic device using a third NN, a bounding box around the given object using the third feature vector.

In some embodiments of the method, the point cloud is an augmented point cloud such that a given augmented point from the augmented point cloud is associated with the location of the given object relative to the SDC and visual characteristics of the given object.

In some embodiments of the method, the generating the cluster of points based on the point cloud comprises: acquiring, by the electronic device from the LIDAR system, point cloud data representative of the point cloud; acquiring, by the electronic device from a camera system, image data representative of an image of the surroundings of the SDC; generating, by the electronic device employing a fourth NN, visual characteristics for respective pixels of the image; generating, by the electronic device, an augmented point cloud by projecting the pixels of the image with respective visual characteristics onto corresponding points from the point cloud, such that a given augmented point from the augmented point cloud is associated with the location of the given object relative to the SDC and the visual characteristics of the respective pixel; and generating, by the electronic device, the cluster of points based on the augmented point cloud.

In some embodiments of the method, the generating the cluster of points based on the augmented point cloud comprises: segmenting, by the electronic device, the augmented point cloud into at least two classes of points, where the at least two classes of points includes an object class. The augmented points of the object class are associated with a given object in the surroundings of the SDC. The generating the cluster of points based on the augmented point cloud comprises generating, by the electronic device, distance vectors for the augmented points of the object class, where a given distance vector is representative of an estimated distance of the respective augmented point of the object class from a potential center-point of the given object. The generating the cluster of points based on the augmented point cloud comprises generating, by the electronic device, modified augmented points of the object class by moving their respective locations in a direction of the respective distance vectors, and executing, by the electronic device, a clustering algorithm onto the modified augmented points for identifying the cluster.

In some embodiments of the method, the local context is representative of a geometry of the given object in the surroundings of the SDC.

In some embodiments of the method, the second NN has a receptive field capturing the portion of the point cloud.

In some embodiments of the method, the portion of the point cloud excludes points from the point cloud that are outside the receptive field of the second NN.

In some embodiments of the method, the global context is representative of a geometry of other potential objects in the surroundings of the SDC.

In some embodiments of the method, the generating the bounding box comprises generating, by the electronic device using the first NN, a fourth feature vector based on the cluster of points and the third feature vector, where the fourth feature vector is associated with each point from the cluster. The generating the bounding box comprises generating, by the electronic device using the second NN, fifth feature vectors for respective points from the cluster based on the portion of the point cloud, where the portion includes the points from the cluster and other points from the point cloud that are in proximity to the cluster. The generating the bounding box comprises generating, by the electronic device using the first NN, a sixth feature vector for the given object based on the fifth feature vectors of the cluster, and generating, by the electronic device using the third NN, the bounding box around the given object using the sixth feature vector instead of the third feature vector.

In some embodiments of the method, the second NN is a Convolutional NN.

In some embodiments of the method, the third NN is a Multi-Layer Perceptron (MLP).

In some embodiments of the method, the generating the third feature vector for the given object is performed at a first moment in time. The method further comprises generating, by the electronic device using the first NN, an other third feature vector for an other given object at a second moment in time, and generating, by the electronic device, a similarity feature by comparing the third feature vector with the other third feature vector. In response to the similarity feature being above a pre-determined threshold, the method further comprises determining, by the electronic device, that the given object at the first moment in time and the other given object at the second moment in time is a same object, and generating, by the electronic device, kinematic data for the same object based on a location of the bounding box generated based on the third feature vector at the first moment in time and a location of an other bounding box generated based on the other third feature vector at the second moment in time.

In some embodiments of the method, the method further comprises identifying, by the electronic device, at least one outlier point in the point cloud, where the outlier point belongs to the given object and excluded from the cluster, and generating, by the electronic device, a modified bounding box for the given object based on the bounding box and the at least one outlier point.

In a second broad aspect of the present technology, there is provided an electronic device for detecting an object in a surrounding of a SDC. A LIDAR system being mounted onto the SDC and being communicatively coupled to the electronic device. The electronic device is configured to generate a cluster of points from a point cloud, where the point cloud is representative of the surroundings of the SDC, and each point in the cluster is associated with a given object. The electronic device is configured to generate by using a first Neural Network (NN), a first feature vector based on the cluster. The first feature vector is associated with each point from the cluster and is indicative of a local context of the given object in the surroundings of the SDC. The electronic device is configured to generate by using a second NN, second feature vectors for respective points from the cluster based on a portion of the point cloud. The portion includes the points from the cluster and other points from the point cloud that are in proximity to the cluster. A given second feature vector of the respective point from the cluster is indicative of the local context of the given object in the surroundings of the SDC and of a global context of the given object in the surroundings of the SDC. The electronic device is configured to generate by using the first NN, a third feature vector for the given object based on the second feature vectors of the cluster. The third feature vector is representative of the given object in the surroundings of the SDC and is indicative of both the local and global context of the object in the surroundings of the SDC. The electronic device is configured to generate by using a third NN, a bounding box around the given object using the third feature vector.

In some embodiments of the electronic device, the point cloud is an augmented point cloud such that a given augmented point from the augmented point cloud is associated with the location of the given object relative to the SDC and visual characteristics of the given object.

In some embodiments of the electronic device, the electronic device configured to generate the cluster of points based on the point cloud comprises the electronic device configured to: acquire from the LIDAR system, point cloud data representative of the point cloud; acquire from a camera system, image data representative of an image of the surroundings of the SDC; generate by employing a fourth NN, visual characteristics for respective pixels of the image; generate an augmented point cloud by projecting the pixels of the image with respective visual characteristics onto corresponding points from the point cloud, such that a given augmented point from the augmented point cloud is associated with the location of the given object relative to the SDC and the visual characteristics of the respective pixel; and generate the cluster of points based on the augmented point cloud.

In some embodiments of the electronic device, the electronic device configured to generate the cluster of points based on the augmented point cloud comprises the electronic device configured to: segment the augmented point cloud into at least two classes of points, where the at least two classes of points includes an object class, and the augmented points of the object class is associated with a given object in the surroundings of the SDC; generate distance vectors for the augmented points of the object class, where a given distance vector is representative of an estimated distance of the respective augmented point of the object class from a potential center-point of the given object; generate modified augmented points of the object class by moving their respective locations in a direction of the respective distance vectors; and execute a clustering algorithm onto the modified augmented points for identifying the cluster.

In some embodiments of the electronic device, the local context is representative of a geometry of the given object in the surroundings of the SDC.

In some embodiments of the electronic device, the second NN has a receptive field capturing the portion of the point cloud.

In some embodiments of the electronic device, the portion of the point cloud excludes points from the point cloud that are outside the receptive field of the second NN.

In some embodiments of the electronic device, the global context is representative of a geometry of other potential objects in the surroundings of the SDC.

In some embodiments of the electronic device, the electronic device configured to generate the bounding box comprises the electronic device configured to generate by using the first NN, a fourth feature vector based on the cluster of points and the third feature vector, where the fourth feature vector is associated with each point from the cluster; generate by using the second NN, fifth feature vectors for respective points from the cluster based on the portion of the point cloud, where the portion includes the points from the cluster and other points from the point cloud that are in proximity to the cluster; generate by using the first NN, a sixth feature vector for the given object based on the fifth feature vectors of the cluster; and generate by using the third NN, the bounding box around the given object using the sixth feature vector instead of the third feature vector.

In some embodiments of the electronic device, the second NN is a Convolutional NN.

In some embodiments of the electronic device, the third NN is a Multi-Layer Perceptron (MLP).

In some embodiments of the electronic device, the electronic device is configured to generate the third feature vector for the given object at a first moment in time. The electronic device is further configured to generate by using the first NN, an other third feature vector for an other given object at a second moment in time, and generate a similarity feature by comparing the third feature vector with the other third feature vector. In response to the similarity feature being above a pre-determined threshold, the electronic device is further configured to determine that the given object at the first moment in time and the other given object at the second moment in time is a same object, and generate kinematic data for the same object based on a location of the bounding box generated based on the third feature vector at the first moment in time and a location of an other bounding box generated based on the other third feature vector at the second moment in time.

In some embodiments of the electronic device, the electronic device is further configured to identify at least one outlier point in the point cloud, where the outlier point belongs to the given object and is excluded from the cluster, and generate a modified bounding box for the given object based on the bounding box and the at least one outlier point.

In the context of the present specification, the term "surroundings" of a given vehicle refers to an area or a volume around the given vehicle including a portion of a current environment thereof accessible for scanning using one or more sensors mounted on the given vehicle, for example, for generating a 3D map of the such surroundings or detecting objects therein.

In the context of the present specification, a "Region of Interest" may broadly include a portion of the observable environment of a LiDAR system in which the one or more objects may be detected. It is noted that the region of interest of the LiDAR system may be affected by various conditions such as but not limited to: an orientation of the LiDAR system (e.g. direction of an optical axis of the LiDAR system); a position of the LiDAR system with respect to the environment (e.g. distance above ground and adjacent topography and obstacles); operational parameters of the LiDAR system (e.g. emission power, computational settings, defined angles of operation), etc. The ROI of LIDAR system may be defined, for example, by a plane angle or a solid angle. In one example, the ROI may also be defined within a certain distance range (e.g. up to 200 m or so).

In the context of the present specification, a "server" is a computer program that is running on appropriate hardware and is capable of receiving requests (e.g. from client devices) over a network, and carrying out those requests, or causing those requests to be carried out. The hardware may be implemented as one physical computer or one physical computer system, but neither is required to be the case with respect to the present technology. In the present context, the use of the expression a "server" is not intended to mean that every task (e.g. received instructions or requests) or any particular task will have been received, carried out, or caused to be carried out, by the same server (i.e. the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "electronic device" is any computer hardware that is capable of running software appropriate to the relevant task at hand. In the context of the present specification, the term "electronic device" implies that a device can function as a server for other electronic devices and client devices, however it is not required to be the case with respect to the present technology. Thus, some (non-limiting) examples of electronic devices include personal computers (desktops, laptops, netbooks, etc.), smart phones, and tablets, as well as network equipment such as routers, switches, and gateways. It should be understood that in the present context the fact that the device functions as an electronic device does not mean that it cannot function as a server for other electronic devices. The use of the expression "an electronic device" does not preclude multiple client devices being used in receiving/sending, carrying out or causing to be carried out any task or request, or the consequences of any task or request, or steps of any method described herein.

In the context of the present specification, "client device" is any computer hardware that is capable of running software appropriate to the relevant task at hand. In the context of the present specification, in general the term "client device" is associated with a user of the client device. Thus, some (non-limiting) examples of client devices include personal computers (desktops, laptops, netbooks, etc.), smart phones, and tablets, as well as network equipment such as routers, switches, and gateways It should be noted that a device acting as a client device in the present context is not precluded from acting as a server to other client devices. The use of the expression "a client device" does not preclude multiple client devices being used in receiving/sending, carrying out or causing to be carried out any task or request, or the consequences of any task or request, or steps of any method described herein.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, etc.

In the context of the present specification, the expression "software component" is meant to include software (appropriate to a particular hardware context) that is both necessary and sufficient to achieve the specific function(s) being referenced.

In the context of the present specification, the expression "computer information storage media" (also referred to as "storage media") is intended to include media of any nature and kind whatsoever, including without limitation RAM, ROM, disks (CD-ROMs, DVDs, floppy disks, hard drivers, etc.), USB keys, solid state-drives, tape drives, etc. A plurality of components may be combined to form the computer information storage media, including two or more media components of a same type and/or two or more media components of different types.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first database" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware components, in other cases they may be different software and/or hardware components Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

These and other features, aspects and advantages of the present technology will become better understood with regard to the following description, appended claims and accompanying drawings where:

DETAILED DESCRIPTION

Figure 1:
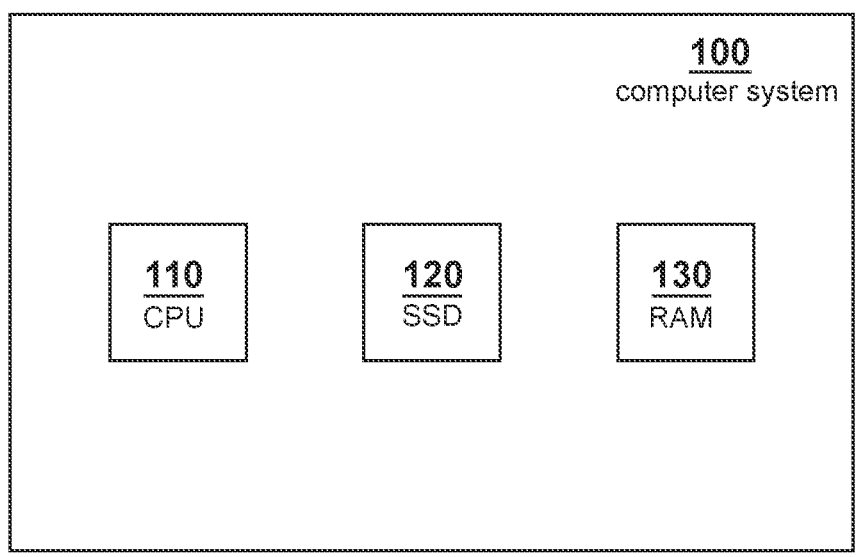
FIG. 1 depicts a schematic diagram of an example computer system configurable for implementing certain non-limiting embodiments of the present technology.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes which may be substantially represented in computer-readable media and so executed by a computer or processor, whether or not such computer or processor is explicitly shown.

The functions of the various elements shown in the figures, including any functional block labeled as a "processor", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

With these fundamentals in place, we will now consider some non-limiting examples to illustrate various implementations of aspects of the present technology.

Computer System

Referring initially to FIG. 1, there is depicted a schematic diagram of a computer system 100 suitable for use with some implementations of the present technology. The computer system 100 includes various hardware components including one or more single or multi-core processors collectively represented by a processor 110, a solid-state drive 120, and a memory 130, which may be a random-access memory or any other type of memory.

Communication between the various components of the computer system 100 may be enabled by one or more internal and/or external buses (not shown) (e.g. a PCI bus, universal serial bus, IEEE 1394 "Firewire" bus, SCSI bus, Serial-ATA bus, etc.), to which the various hardware components are electronically coupled. According to embodiments of the present technology, the solid-state drive 120 stores program instructions suitable for being loaded into the memory 130 and executed by the processor 110 for determining a presence of an object. For example, the program instructions may be part of a vehicle control application executable by the processor 110. It is noted that the computer system 100 may have additional and/or optional components (not depicted), such as network communication modules, localization modules, and the like.

Networked Computing Environment

Figure 2:
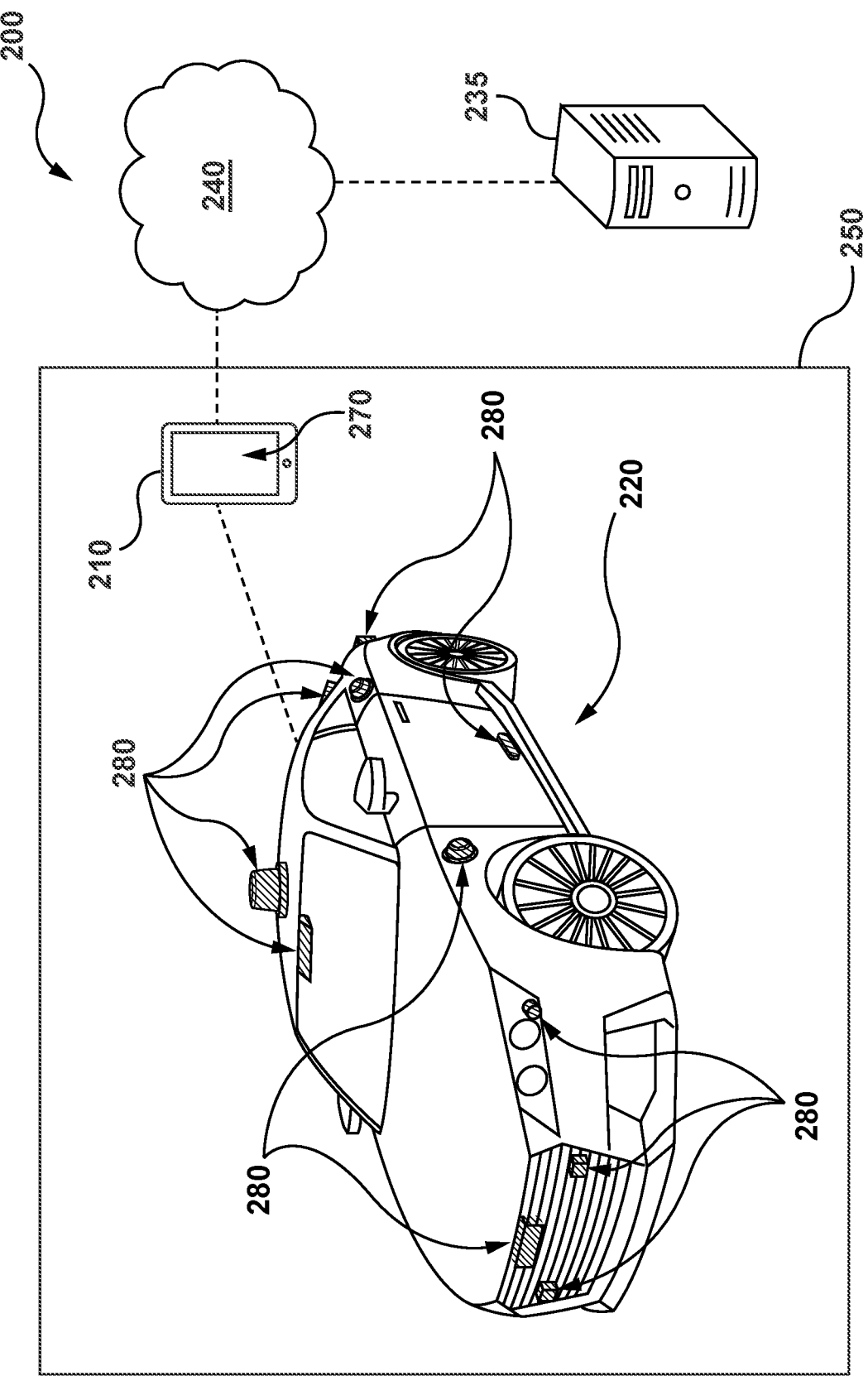
FIG. 2 depicts a schematic diagram of a networked computing environment being suitable for use with certain non-limiting embodiments of the present technology.

With reference to FIG. 2, there is depicted a networked computing environment 200 suitable for use with some non-limiting embodiments of the present technology. The networked computing environment 200 includes an electronic device 210 associated with a vehicle 220 and/or associated with a user (not depicted) who is associated with the vehicle 220 (such as an operator of the vehicle 220). The networked computing environment 200 also includes a server 235 in communication with the electronic device 210 via a communication network 240 (e.g. the Internet or the like, as will be described in greater detail herein below).

In at least some non-limiting embodiments of the present technology, the electronic device 210 is communicatively coupled to control systems of the vehicle 220. The electronic device 210 could be arranged and configured to control different operations systems of the vehicle 220, including but not limited to: an ECU (engine control unit), steering systems, braking systems, and signaling and illumination systems (i.e. headlights, brake lights, and/or turn signals). In such an embodiment, the vehicle 220 could be a self-driving vehicle 220.

In some non-limiting embodiments of the present technology, the networked computing environment 200 could include a GPS satellite (not depicted) transmitting and/or receiving a GPS signal to/from the electronic device 210. It will be understood that the present technology is not limited to GPS and may employ a positioning technology other than GPS. It should be noted that the GPS satellite can be omitted altogether.

The vehicle 220, to which the electronic device 210 is associated, could be any transportation vehicle, for leisure or otherwise, such as a private or commercial car, truck, motorbike or the like. Although the vehicle 220 is depicted as being a land vehicle, this may not be the case in each and every non-limiting embodiment of the present technology. For example, in certain non-limiting embodiments of the present technology, the vehicle 220 may be a watercraft, such as a boat, or an aircraft, such as a flying drone.

The vehicle 220 may be user operated or a driver-less vehicle. In some non-limiting embodiments of the present technology, it is contemplated that the vehicle 220 could be implemented as a Self-Driving Car (SDC). It should be noted that specific parameters of the vehicle 220 are not limiting, these specific parameters including for example: vehicle manufacturer, vehicle model, vehicle year of manufacture, vehicle weight, vehicle dimensions, vehicle weight distribution, vehicle surface area, vehicle height, drive train type (e.g. 2× or 4×), tire type, brake system, fuel system, mileage, vehicle identification number, and engine size.

According to the present technology, the implementation of the electronic device 210 is not particularly limited. For example, the electronic device 210 could be implemented as a vehicle engine control unit, a vehicle CPU, a vehicle navigation device (e.g. TomTom™, Garmin™), a tablet, a personal computer built into the vehicle 220, and the like. Thus, it should be noted that the electronic device 210 may or may not be permanently associated with the vehicle 220. Additionally or alternatively, the electronic device 210 could be implemented in a wireless communication device such as a mobile telephone (e.g. a smart-phone or a radio-phone). In certain embodiments, the electronic device 210 has a display 270.

The electronic device 210 could include some or all of the components of the computer system 100 depicted in FIG. 1, depending on the particular embodiment. In certain embodiments, the electronic device 210 is an on-board computer device and includes the processor 110, the solid-state drive 120 and the memory 130. In other words, the electronic device 210 includes hardware and/or software and/or firmware, or a combination thereof, for processing data as will be described in greater detail below.

In some non-limiting embodiments of the present technology, the communication network 240 is the Internet. In alternative non-limiting embodiments of the present technology, the communication network 240 can be implemented as any suitable local area network (LAN), wide area network (WAN), a private communication network or the like. It should be expressly understood that implementations for the communication network 240 are for illustration purposes only. A communication link (not separately numbered) is provided between the electronic device 210 and the communication network 240, the implementation of which will depend, inter alia, on how the electronic device 210 is implemented. Merely as an example and not as a limitation, in those non-limiting embodiments of the present technology where the electronic device 210 is implemented as a wireless communication device such as a smartphone or a navigation device, the communication link can be implemented as a wireless communication link. Examples of wireless communication links may include, but are not limited to, a 3G communication network link, a 4G communication network link, and the like. The communication network 240 may also use a wireless connection with the server 235.

In some embodiments of the present technology, the server 235 is implemented as a computer server and could include some or all of the components of the computer system 100 of FIG. 1. In one non-limiting example, the server 235 is implemented as a Dell™ PowerEdge™ Server running the Microsoft™ Windows Server™ operating system, but can also be implemented in any other suitable hardware, software, and/or firmware, or a combination thereof. In the depicted non-limiting embodiments of the present technology, the server 235 is a single server. In alternative non-limiting embodiments of the present technology, the functionality of the server 235 may be distributed and may be implemented via multiple servers (not shown).

In some non-limiting embodiments of the present technology, the processor 110 of the electronic device 210 could be in communication with the server 235 to receive one or more updates. Such updates could include, but are not limited to, software updates, map updates, routes updates, weather updates, and the like. In some non-limiting embodiments of the present technology, the processor 110 can also be configured to transmit to the server 235 certain operational data, such as routes travelled, traffic data, performance data, and the like. Some or all such data transmitted between the vehicle 220 and the server 235 may be encrypted and/or anonymized.

It should be noted that a variety of sensors and systems may be used by the electronic device 210 for gathering information about surroundings 250 of the vehicle 220. As seen in FIG. 2, the vehicle 220 may be equipped with a plurality of sensor systems 280. It should be noted that different sensor systems from the plurality of sensor systems 280 may be used for gathering different types of data regarding the surroundings 250 of the vehicle 220.

In one example, the plurality of sensor systems 280 may include various optical systems including, inter alia, one or more camera-type sensor systems that are mounted to the vehicle 220 and communicatively coupled to the processor 110 of the electronic device 210. Broadly speaking, the one or more camera-type sensor systems may be configured to gather image data about various portions of the surroundings 250 of the vehicle 220. In some cases, the image data provided by the one or more camera-type sensor systems could be used by the electronic device 210 for performing object detection procedures. For example, the electronic device 210 could be configured to feed the image data provided by the one or more camera-type sensor systems to an Object Detection Neural Network (ODNN) that has been trained to localize and classify potential objects in the surroundings 250 of the vehicle 220.

In another example, the plurality of sensor systems 280 could include one or more radar-type sensor systems that are mounted to the vehicle 220 and communicatively coupled to the processor 110. Broadly speaking, the one or more radar-type sensor systems may be configured to make use of radio waves to gather data about various portions of the surroundings 250 of the vehicle 220. For example, the one or more radar-type sensor systems may be configured to gather radar data about potential objects in the surroundings 250 of the vehicle 220, such data potentially being representative of a distance of objects from the radar-type sensor system, orientation of objects, velocity and/or speed of objects, and the like.

In a further example, the plurality of sensor systems 280 could include one or more Light Detection and Ranging (LIDAR) systems that are mounted to the vehicle 220 and communicatively coupled to the processor 110. Broadly speaking, a LIDAR system is configured to capture data about the surroundings 250 of the vehicle 220 used, for example, for building a multi-dimensional map of objects in the surroundings 250 of the vehicle 220. The LIDAR system could be mounted, or retrofitted, to the vehicle 220 in a variety of locations and/or in a variety of configurations for gathering information about surroundings 250 of the vehicle 220.

For example, depending on the implementation of the vehicle 220 and the LIDAR system, the LIDAR system could be mounted on an interior, upper portion of a windshield of the vehicle 220. Nevertheless, other locations for mounting the lidar system are within the scope of the present disclosure, including on a back window, side windows, front hood, rooftop, front grill, front bumper or the side of the vehicle 220.

In the context of the present technology, the electronic device 210 is configured to detect one or more objects in the surroundings 250 of the vehicle 220 based on data acquired from one or more camera systems and from one or more LIDAR systems. For example, the electronic device 210 configured to detect a given object in the surroundings 250 of the vehicle 220 may be configured to receive LIDAR data and camera data associated with the given object, generate an "embedding" representative of features associated with the given object, and detect the object by generating a bounding box for the object.

Figure 3:
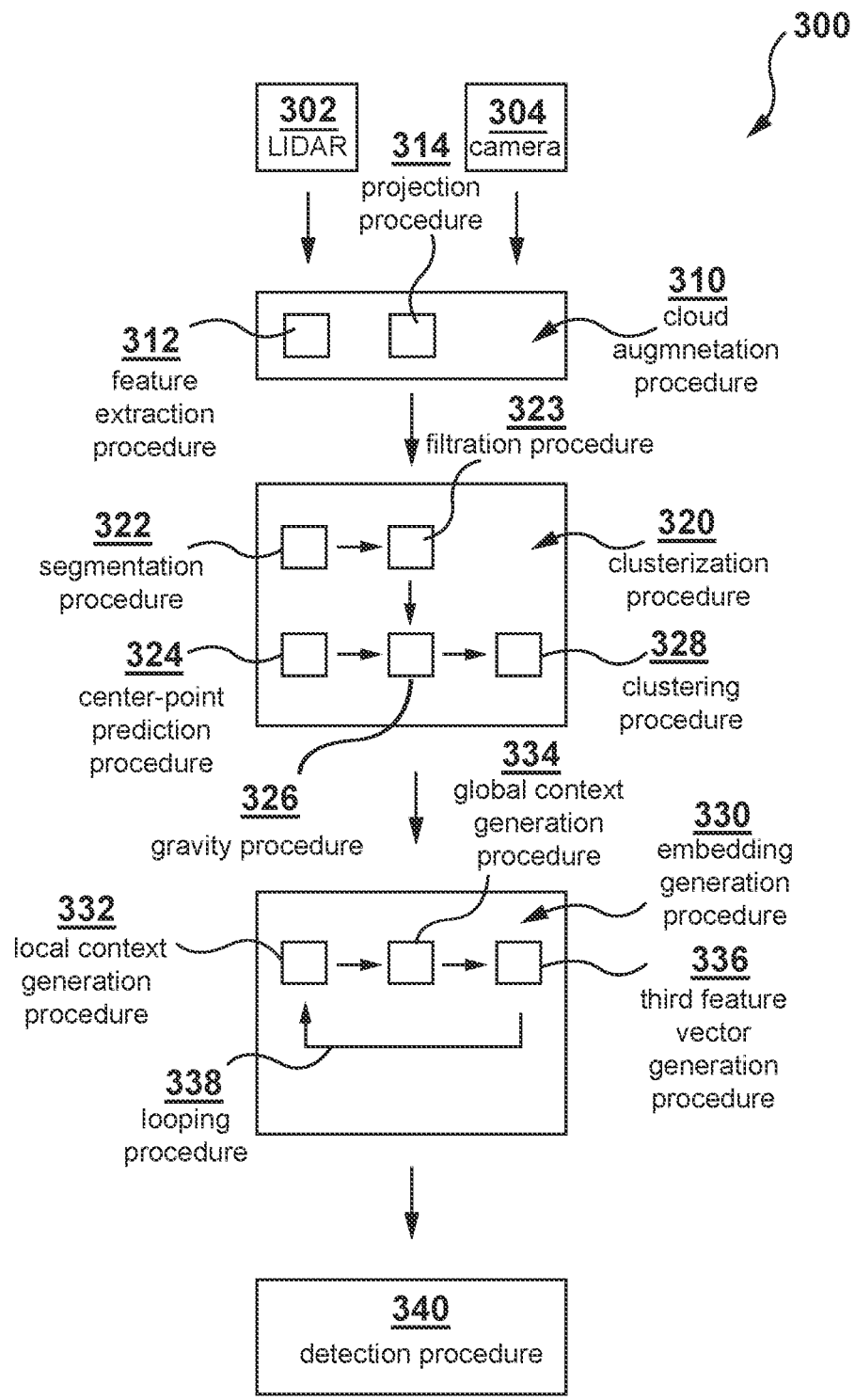
FIG. 3 depicts a representation of computer-implemented procedures performed by an electronic device for detecting an object in surroundings of a Self-Driving Car (SDC) of the networked computing environment of FIG. 2, in accordance with at least some non-limiting embodiments of the present technology.

With reference to FIG. 3, there is depicted a processing procedure 300 for detecting object(s) in the surroundings 250 of the vehicle 220. The processing procedure 300 begins with the electronic device 210 acquiring information from the LIDAR sensor 302 and the camera sensor 304. In some non-limiting embodiments of the present technology, the information from the LIDAR sensor 302 comes in a form of point cloud data and the information from the camera sensor 304 comes in a form of image data (such as an RBG image or the like). The electronic device 210 is configured to perform a cloud augmentation procedure 310 (FIG. 4) for generating an augmented point cloud based on point cloud data from the LIDAR sensor 302 and image data from the camera sensor 304. As it will be described with greater details below with reference to FIG. 4, the electronic device 210 may also be configured to execute a visual feature extraction procedure 312 for extracting visual features from image data, and a projection procedure 314 for, in a sense, matching points from the point cloud data with pixels (and respective visual features) in the image data.

The electronic device 210 is configured to perform a cloud clusterization procedure 320 (FIG. 5) for generating one or more clusters of points from an augmented point cloud where a given cluster of augmented points is associated with a respective object in the surroundings 250 of the vehicle 220. As it will be described in greater details below with reference to FIG. 5, the electronic device 210 may be configured to execute a segmentation procedure 322 for classifying the points from the augmented point cloud into different classes, a filtration procedure 323 for filtering out points that are not associated with an object class (for example), a center-point prediction procedure 324 for determining a "distance" of respective points from an estimated center-point of a respective object, a gravity procedure 326 for in a sense "moving" points in a direction of the respective estimated center-point, and a clustering procedure 328 for identifying a cluster of points that are associated with a given object.

It is contemplated that the purpose of the cloud augmentation procedure 310 is to "augment" the point cloud data from the LIDAR sensor 302 with visual features extracted from the image data of the camera sensor 304. Developers of the present technology have realized that, in at least some implementations of the present technology, so-augmenting the point cloud data with visual features may allow the electronic device 210 to improve the cloud clusterization procedure 320 that is executed by the electronic device 210 for identifying one or more clusters in the point cloud data associated with respective objects in the surroundings 250 of the vehicle 220.

The electronic device 210 is configured to perform an embedding generation procedure 330 for generating a feature vector or an "embedding" representative of a given object in the surroundings 250 of the vehicle 220. As it will be described in greater details below, the electronic device 210 may be configured to execute a local context generation procedure 332 (FIG. 6) for determining information indicative of a "local context" of a given object in the surroundings 250 of the vehicle 220, a global context generation procedure 334 (FIG. 7) for determining information indicative of a "global context" of the given object in the surroundings 250 of the vehicle 220, a third feature vector generation procedure 336 (FIG. 8) for determining a feature vector representative of the given object in the surroundings 250 of the vehicle 220, and potentially a looping procedure 338.

The electronic device 210 is configured to perform a detection procedure 340 (FIG. 9) for generating a bounding box for a given object based on a feature vector generated for that object by the electronic device 210. For example, the electronic device 210 may be configured to use a given third feature vector generated via the third feature vector generation procedure 336 for performing the detection procedure 340, or alternatively, may be configured to use another feature vector generated via the third feature vector generation procedure 336 after one or more looping procedures 338 for performing the detection procedure 340.

Figure 4:
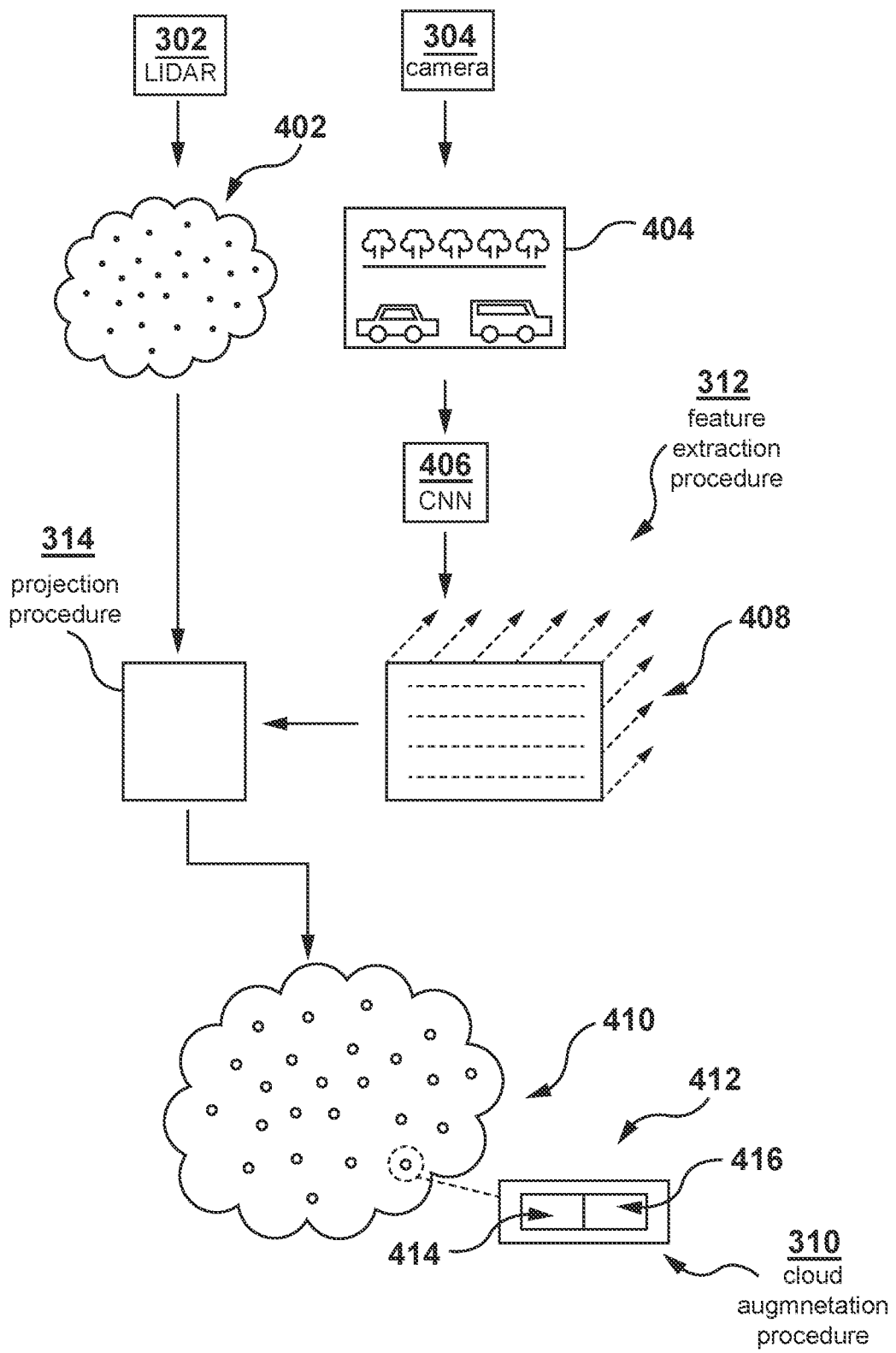
FIG. 4 depicts a cloud augmentation procedure of FIG. 3, in accordance with at least some non-limiting embodiments of the present technology.

With reference to FIG. 4, there is depicted a representation of how the cloud augmentation procedure 310 may be performed in at least some embodiments of the present technology.

On the one hand, the camera sensor 304 is configured to generate image data 404. The image data 404 is processed by a Convolutional Neural Network (CNN) 406. Broadly speaking the CNN 406 is configured to perform the visual feature extraction procedure 312 on the image data 404. The CNN 406 receives the image data 404 as input and generates an output in a form of a tensor 408 comprising information indicative of visual characteristics/features of the surroundings 250 of the vehicle 220 extracted by the CNN 406 from the image data 404. For example, the CNN 406 may extract image features for respective pixels of an image and which features are included in the tensor 408.

On the other hand, the LIDAR sensor 302 is configured to generate point cloud data in a form of a point cloud 402. Broadly speaking, the point cloud 402 comprises a plurality of points that form a 3D representation of the surroundings 250 of the vehicle 220. For example, each point in the point cloud may comprise information indicative of a location of a given surface that reflected a signal from the LIDAR sensor 302. Other lidar attributes may be associated with respective points from the cloud 402 as is known in the art.

The electronic device 210 is then configured to perform the projection procedure 314. The purpose of the projection procedure 314 is to in a sense "combine" information obtained from the LIDAR sensor 302 and the camera sensor 304. In other words, the projection procedure 314 may allow the electronic device 210 to generate an augmented point cloud based on information from the point cloud 402 and from the tensor 408. To that end, the electronic device 210 may be configured to use a "projection matrix" for determining a correspondence between pixels of the image (and the visual characteristics/features extracted therefrom) and points from the point cloud 402.

It should be noted that the LIDAR sensor 302 and the camera sensor 304 have respective coordinate systems that are relative to the vehicle 220. Having access to these coordinate systems allows the electronic device 210 to construct the projection matrix from a 3D representation of the surroundings 250 into the image plane of the image captured by the camera sensor 304. For example, a given point from the point cloud 402 can be used in combination with (multiplied by) projection matrix for returning a 2D coordinate representative of a position of a given pixel on the image.

Hence, the electronic device 210 may be configured to generate an augmented point cloud 410 by employing the projection procedure 314 based on the point cloud 402 and the tensor 408. For example, a given augmented point from the augmented point cloud 410 may now be associated with augmented point information 412 comprising point information 414 from a respective point from the point cloud 402, such as LIDAR attributes, for example, and image information 416, such as RGB attributes of a respective pixel and visual characteristics/features associated with the respective pixel.

Developers of the present technology have realized that performing the cloud augmentation procedure 310, during which the electronic device 210 is configured to generate the augmented point cloud 410 by combining information from the point cloud 402 and the image data 404, may increase the quality of the cloud clusterization procedure 320. Some embodiments of the present technology may allow reducing the number of points that are erroneously included in, and/or excluded from, a cluster of points associated with a given object during the cloud clusterization procedure 310. The determining a given cluster of points associated with a given object in the surroundings of the vehicle 220 may be facilitated by adding visual information to the point cloud 402 generated by the LIDAR sensor 302.

Figure 5:
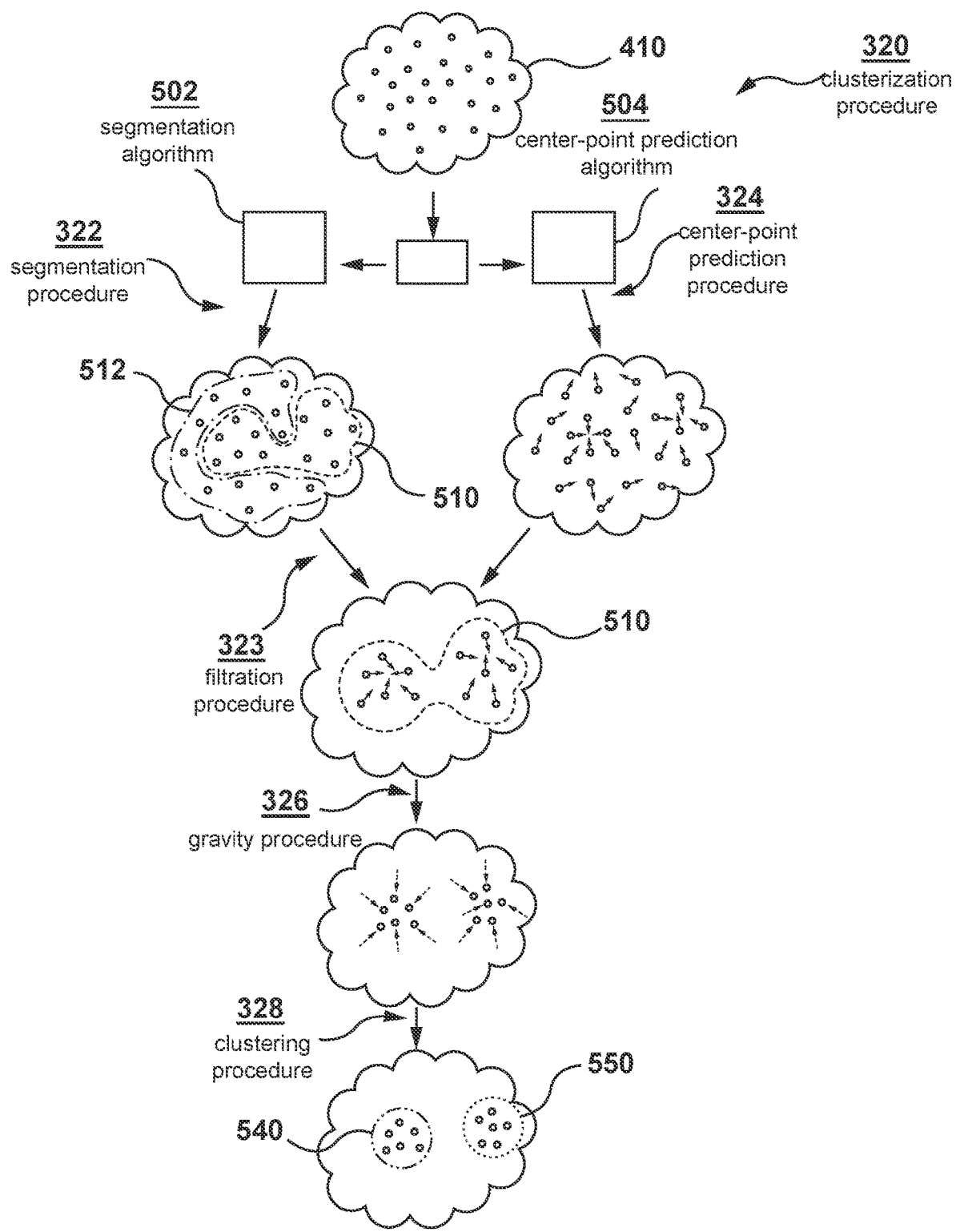
FIG. 5 depicts a cloud clusterization procedure of FIG. 3, in accordance with at least some non-limiting embodiments of the present technology.

How the electronic device 210 is configured to perform the clusterization procedure 320 based on the augmented point cloud 410 will now be described in greater details with reference to FIG. 5.

Broadly speaking, the purpose of the clusterization procedure 320 is to generate a cluster of points from either one of the point cloud 402 or the augmented point cloud 410 that are associated with a given object in the surroundings of the vehicle 220. In some embodiments, such as the one illustrated in FIG. 5, the electronic device 210 may also be configured to generate more than one cluster, namely a first cluster 540 and a second cluster 550. It should be noted that the points in the first cluster 540 are associated with a first given object and the second cluster 550 is associated with a second given object in the surroundings of the vehicle 220.

The electronic device 210 may employ a segmentation algorithm 502 for segmenting the augmented point cloud 410 and a center-point predication algorithm 504 for determining distance vectors for respective points representation an estimated distance to an object's center-point.

On the one hand, the purpose of the segmentation algorithm 502 is to classify the augmented points from the augmented point cloud into at least two classes. For example, the segmentation algorithm 502 may allow the electronic device 210 to determine whether a given augmented point is of an object class or a non-object class. In another example, the segmentation algorithm 502 may allow the electronic device 210 to determine whether the given augmented point is of a car-object class, a pedestrian-object class, a motorcycle-object class, or other class.

In at least some embodiments of the present technology, it is contemplated that the segmentation algorithm 502 may be configured to perform 3D semantic segmentation during which augmented points from an augmented point cloud are classified under the most likely class according to the predicted class probabilities.

The segmentation algorithm 502 may be implemented as a NN trained for 3D semantic segmentation. In some embodiments, the segmentation algorithm 502 may be trained in a manner known from aspects disclosed in "*Sensor Fusion for Joint 3D Object Detection and Semantic Segmentation*" authored by Gregory P. Meyer, Jake Charland, Darshan Hegde, Ankit Laddha, Carlos Vallespi-Gonzalez from Uber Advanced Technologies Group, and published on 25 Apr. 2019, the contents of which is incorporated herein by reference in its entirety.

Developers of the present technology have realized that performing object detection based on a semantically segmented point cloud can be ameliorated. In at least some embodiments of the present technology, developers of the present technology have devised systems that, instead of directly using a semantically segmented point cloud for detecting objects, are configured to further augment the semantically segmented point cloud with information indicative of local and global contexts of an object prior to performing detection (e.g., generating a bounding box), in accordance with at least some embodiments of the present technology.

In the illustrated example, the electronic device 210 may be configured to execute the segmentation procedure 322 for determining a first set of augmented points 510 that are of the object class and a second set of augmented points 512 that are not of the object class. As it will be described below, such classification of augmented points may allow filtering out the second set of augmented points 512 that are not of the object class. It should be noted that although the segmentation procedure 322 may allow determining the first set of augmented points 510 that are of the object class, the electronic device 210 does not (yet) have information indicative of whether the first set of augmented points 510 is associated with a same object in the surroundings of the vehicle 220 or with different objects in the surroundings of the vehicle 220.

On the other hand, the purpose of the center-point prediction algorithm 504 is to determine a distance vector for respective points from the augmented point cloud 410. For example, the center-point prediction algorithm 504 may allow the electronic device 210 to determine an estimated distance of a respective augmented point from a potential center-point of a given object to which it belongs.

It should be noted that the center-point prediction algorithm 504 may be implemented as a given NN trained for determining estimated distances of points from a potential center-point of a given object. Just as an example, during a given training iteration of the center-point prediction algorithm 504, the NN may receive labeled point data. The labeled point data may include a plurality of points and a ground-truth bounding box and/or with a ground-truth center-point of the bounding box for a given object with which a subset of the plurality of points is associated. In this non-limiting example, the NN may be tasked with predicting for respective points from the subset of points a distance to a center-point of the ground-truth bounding box. A large number of training iterations may be performed such that the center-point prediction algorithm 504 (the trained NN) is able to predict distances of points from a point cloud to an estimated center-point of a respective object.

In the illustrated example, the electronic device 210 may be configured to execute the center-point prediction procedure 324 and generate a distance vector for respective augmented point from the augmented point cloud 410. Although in the illustrated example, the electronic device 210 generates the distance vector for each augmented point from the augmented point cloud 410, in some embodiments of the present technology, the electronic device 210 may be configured to perform the center-point prediction procedure 324 based on the first set of augmented points 510 only. In other words, the electronic device 210 may first be configured to perform a filtration procedure 323 for filtering out the second set of augmented points 512 that are not of the object class, and then may be configured to use the resulting first set of augmented points 510 that are of the object class as input into the center-point prediction algorithm 504.

The electronic device 210 may be configured to use the first set of augmented points 510 generated by the segmentation procedure 322 and the respective distance vectors generated by the center-point prediction procedure 324 for performing a gravity procedure 326. Broadly speaking, the gravity procedure 326 allows the electronic device 210 to, in a sense, "move" (temporarily for the purpose of determining clusters of points) the locations of the respective augmented points from the first set of augmented points 510 in a direction indicated by their respective distance vectors. In other words, the electronic device 210 is configured to generate modified augmented points (at least temporarily) by moving the first set of augmented points towards the respective potential center-point.

The electronic device 210 is configured to perform the clustering procedure 328 based on the modified augmented points for identifying the first cluster 540 and the second cluster 550. The electronic device 210 may be configured to apply a variety of clustering algorithms such as K-Nearest Neighbor (KNN) algorithms, for example, and/or other algorithms allowing to cluster point data as is known in the art. It should be noted that the first cluster 540 contains augmented points associated with a first object in the surroundings 250 of the vehicle 220, while the second cluster 550 contains augmented points associated with a second object in the surroundings 250 of the vehicle 220.

The electronic device 210 may be configured to store augmented points from the augmented point cloud 410 in association with information indicative of which augmented points are contained in the first cluster 540 and which augmented points are contained in the second cluster 550. In other embodiments, the electronic device 210 may store points from the point cloud 402 in association with information indicative of which points from the point cloud 402 have corresponding augmented points contained in the first cluster 540 and which points from the point cloud 402 have corresponding augmented points contained in the second cluster 550. As it will be discussed herein further below, the electronic device 210 may continue with processing of points from the point cloud 402 or with processing of points from the augmented point cloud 410. It is contemplated that the point cloud 402 may be augmented with visual features for the purpose of generating the first cluster 540 and the second cluster 550, but once the information about these clusters is stored in an index, the electronic device 210 may proceed with processing of the point cloud 402 instead of the processing of the augmented point cloud 410.

As alluded to, the electronic device 210 is configured to generate a first feature vector representative of the first object associated with the first cluster 540 and a second feature vector representative of the second object associated with the second cluster 550. In some embodiments, it can be said that the first feature vector and the second feature vector may be first and second embeddings representative of the first object associated with the first cluster 540 and the second object associated with the second cluster 550, respectively. How the electronic device 210 may be configured to generate these embeddings for respective objects will be described with reference to FIGS. 6 to 8.

Figure 6:
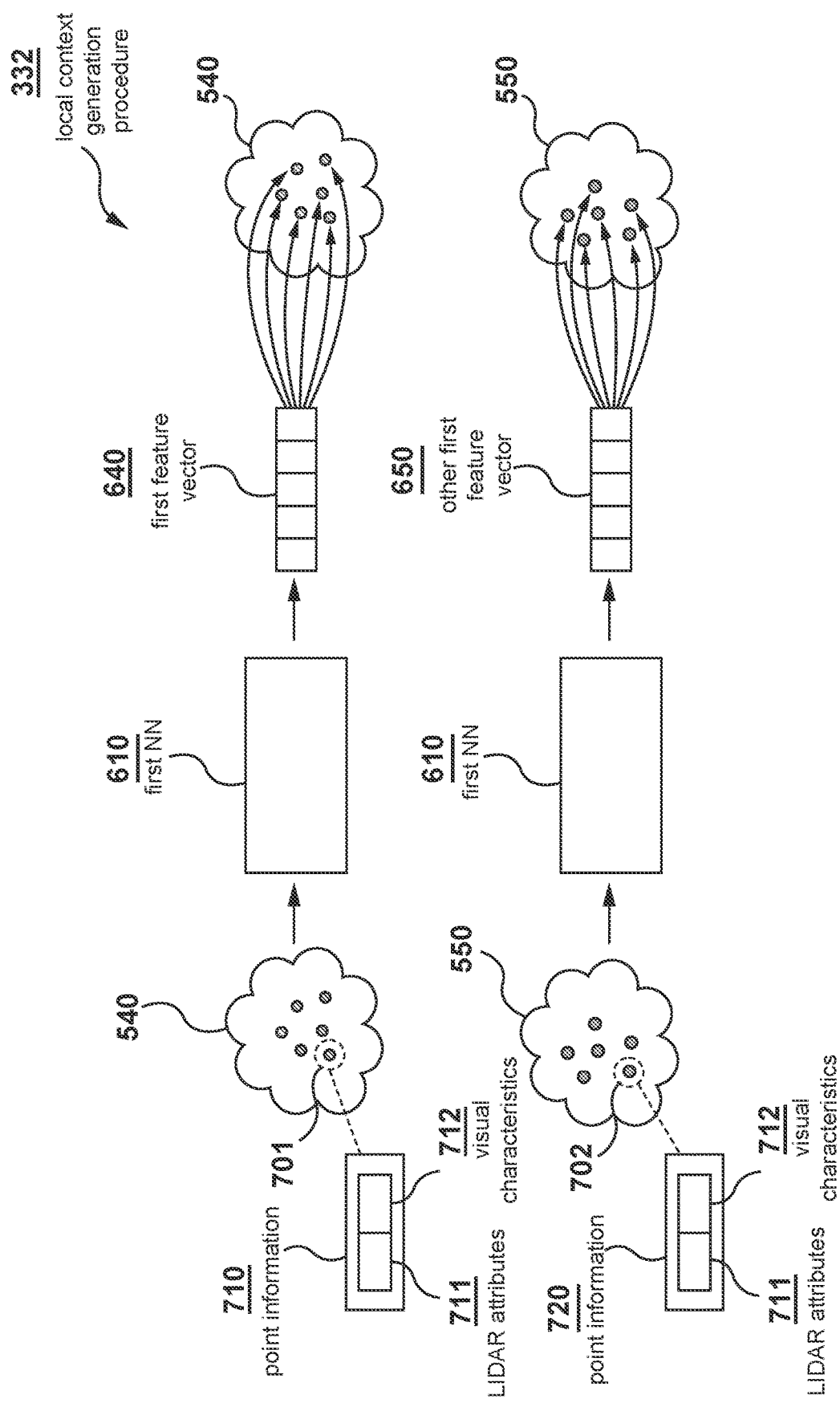
FIG. 6 depicts a local context generation procedure of FIG. 3, in accordance with at least some non-limiting embodiments of the present technology.

It should be noted that the electronic device 210 may be configured to access the index in which the information about the first cluster 540 and about the second cluster 550 is stored. With reference to FIG. 6, the electronic device 210 may be configured to input into a first NN 610 the first cluster 540 of augmented points. For example, a given augmented point 701 from the first cluster 540 is associated with point information 710 including respective LIDAR attributes 711 and visual characteristics 712. The electronic device 210 may be configured to input the first cluster 540 with the respective point information of each point in the first cluster 540 into the first NN 610 configured to generate a first feature vector 640.

The first NN 610 may be implemented in a manner known from aspects disclosed in "*PointNet: Deep Learning on Point Sets for 3D Classification and Segmentation*" authored by Charles R. Qi, Hao Su, Kaichun Mo, and Leonidas J.

Guibas from Stanford University, and published on 10 Apr. 2017, the contents of which is incorporated herein by reference in its entirety.

It should be noted that the first feature vector 640 is indicative of a local context of the respective object associated with the first cluster 540. It can be said that this local context is a function computed based on points from the first cluster 540 and which describes the geometry of an object associated with the first cluster 540, and hence provides "local" information about the respective object. In at least some embodiments of the present technology, this local context may be representative of a geometry of the given object associated with the first cluster 540. The electronic device 210 may be configured to concatenate the first feature vector 640 with point information of each augmented point from the first cluster 540. It can be said that the points of the first cluster 540, in the point cloud, may be augmented with additional information indicative of the local context of its neighbors in that first cluster 540.

By the same token, the electronic device 210 may be configured to input into the first NN 610 the second cluster 550 of augmented points. For example, a given augmented point 702 from the second cluster 550 is associated with point information 720 including respective lidar attributes 721 and visual characteristics 722. The electronic device 210 may be configured to input the second cluster 550 with the respective point information of each point in the second cluster 550 into the first NN 610 configured to generate an other first feature vector 650.

It should be noted that the other first feature vector 650 is indicative of a local context of the respective object associated with the second cluster 550. It can be said that this local context is a function computed based on points from the second cluster 550 and which describes the geometry of an object associated with the second cluster 550, and hence provides "local" information about the respective object. In at least some embodiments of the present technology, this local context may be representative of a geometry of the given object associated with the second cluster 550. The electronic device 210 may be configured to concatenate the other first feature vector 650 with point information of each augmented point from the second cluster 550. It can be said that the points of the second cluster 550, in the point cloud, may be augmented with additional information indicative of the local context of its neighbors in that second cluster 550.

Figure 7:
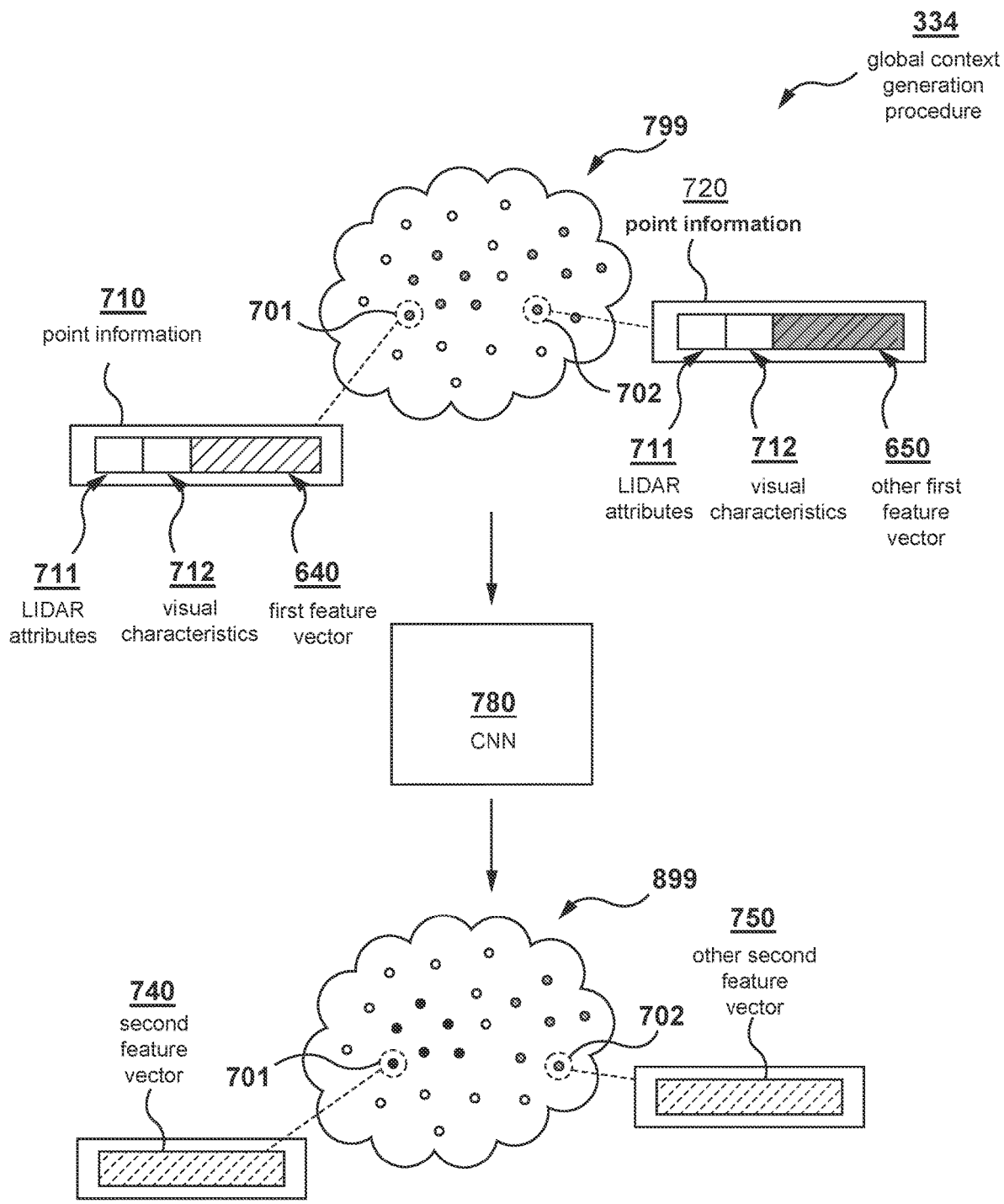
FIG. 7 depicts a global context generation procedure of FIG. 3, in accordance with at least some non-limiting embodiments of the present technology.
Figure 8:
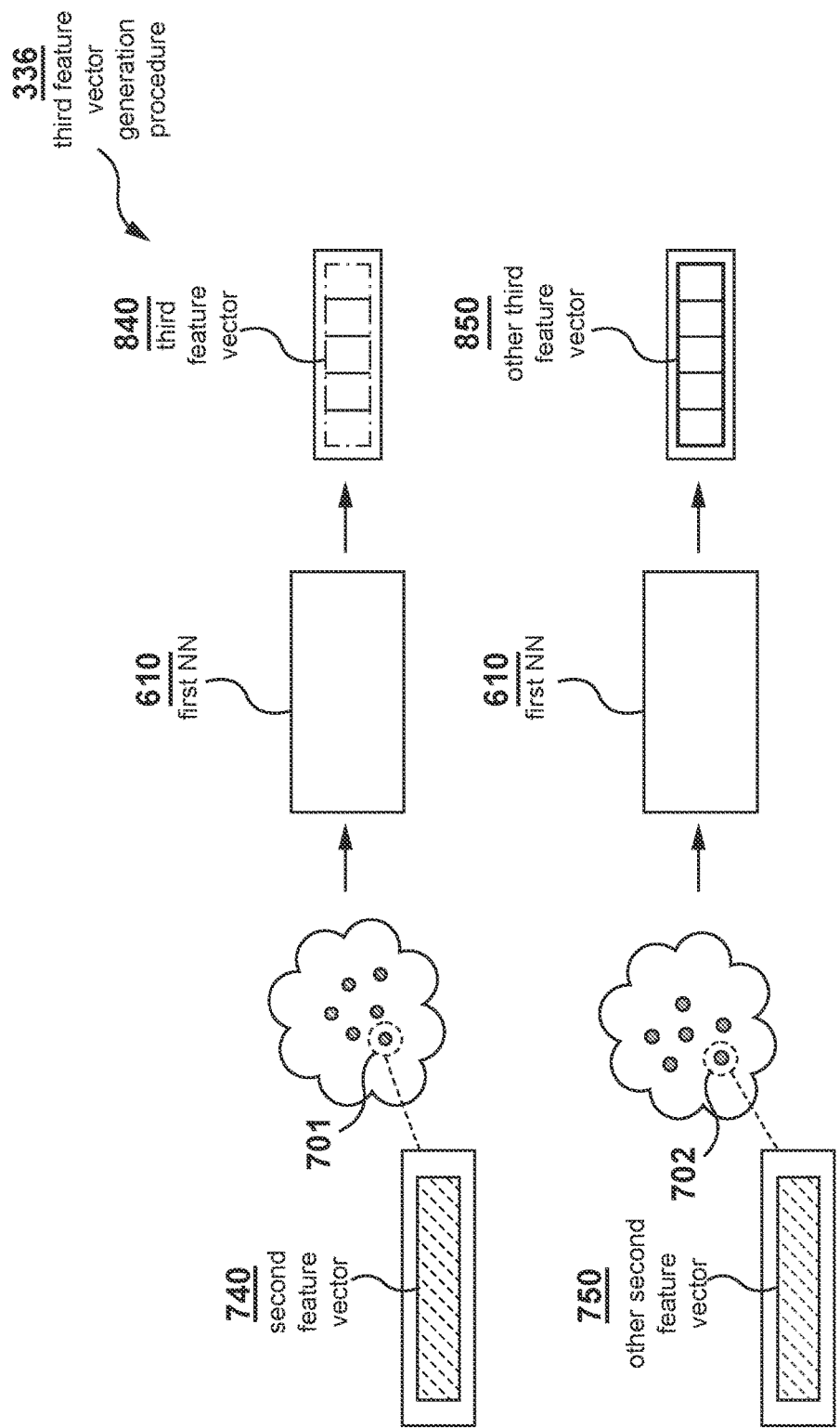
FIG. 8 depicts an object embedding generation procedure of FIG. 3, in accordance with at least some non-limiting embodiments of the present technology.

To better illustrate this, reference will now be made to FIG. 7, where an augmented point cloud 799 is illustrated with the concatenated information as explained above. As depicted in FIG. 7, the given augmented point 701 from the first cluster 540 is associated with the point information 710 that now comprises the first feature vector 640 generated by the first NN 610. Similarly, the given augmented point 702 from the second cluster 550 is associated with the point information 710 that now comprises the other first feature vector 650 generated by the first NN 610.

The electronic device 210 is configured to input the augmented point cloud 799 into a CNN 780 configured to generate for augmented points respective second feature vectors. For example, the electronic device 210 may be configured to use the CNN 780 for generate a second feature vector 740 for the given augmented point 701 from the first cluster 540.

It should be noted that the CNN 780 has a receptive field. In a given CNN, each neuron receives input from some number of locations in the previous layer. In a fully connected layer, each neuron receives input from every neuron of the previous layer. In a convolutional layer, each neuron receives input from only a restricted area of the previous layer called the neuron's receptive field. Thus in each convolutional layer, each neuron takes input from a larger area of points in the input cloud than previous layers. This is due to applying the convolution over and over, which takes into account the value of a point and its neighboring points.

It should be noted that the electronic device 210 employing the CNN 780 can generate the second feature vector 740 for the given augmented point 701 from the first 540 cluster based on a portion of the augmented point cloud 410. The portion includes the points from the first cluster 540 and other augmented points from the augmented point cloud 410 that are in proximity to the first cluster 540. The scope of the portion from the augmented point cloud 410 taken into account by the CNN 780 depends on inter alia a size of the respective field of the CNN 780 that is capturing the portion of the augmented point cloud 410. Hence, the said portion of the augmented point cloud 410 excludes points from the augmented point cloud 410 that are, in a sense, "outside" the receptive field of the CNN 780.

In at least some embodiments of the present technology, the receptive field of the CNN 780 may be of a size that allows to capture at least a portion of the augmented point cloud 799 including the first cluster 540 (with the concatenated data) and other points from the augmented point cloud 799 that are in proximity to the first cluster 540. It is contemplated that the portion of the augmented point cloud 799 excludes points from the point cloud that are outside the receptive field of the CNN 780.

It should be noted that the second feature vector 740 of the given augmented point 701 from the first cluster 540 is indicative of the local context of the respective object associated with the first cluster 540 and of a global context of the respective object associated with the first cluster 540.

The CNN 780 may be configured to generate a given second feature vector for a respective point of the portion of the augmented point cloud 799 by, in a sense, "looking" at point information of neighboring points in the portion. As a result, the given second feature vector of a given point from the first cluster 540 is based on a respective first feature vector indicative of the local context of the object and is now augmented with information indicative of a "global" context of the object in the surroundings 250 of the vehicle 220. It can be said that the global context may be a function computed based on points from the first cluster 540 and other neighboring points from the augmented point cloud 799 and which describes features of points near the first cluster 540 and/or a geometry of potential objects near the first cluster 540 and/or a difference in features between the neighboring points and the points from the first cluster 540, and hence provides "global" information about the respective object. In at least some embodiments, it can be said that the global context may be representative of a geometry of other potential objects in the surroundings of the vehicle 220 and which are located in proximity to the respective object associated with the first cluster 540.

By the same token, the electronic device 210 may be configured to generate an other second feature vector 750 for the given augmented point 702 from the second cluster 550.

As a result, the electronic device 210 may be configured to generate an augmented point cloud 899 where the points from the first cluster 540 are associated with the respective second feature vectors from the CNN 780 and where the point from the second cluster 550 are associated with the respective other second feature vectors from the CNN 780.

As previously alluded to, the electronic device 210 may employ again the first NN 610 for processing the first cluster 540 and the second cluster 550 from the augmented point cloud 899. For example, with reference to FIG. 8, the electronic device 210 is configured to use the second feature vectors of respective augmented points from the first cluster 540 as an input into the first NN 610 for generating a third feature vector 840. The third feature vector 840 is representative of the respective object associated with the first cluster 540 and is indicative of both the local and global contexts of the respective object associated with the first cluster 540.

By the same token, the electronic device 210 is configured to use the other second feature vectors of respective augmented points from the second cluster 550 as an input into the first NN 610 for generating an other third feature vector 850. The other third feature vector 850 is representative of the respective object associated with the second cluster 550 and is indicative of both the local and global contexts of the respective object associated with the second cluster 550.

Figure 9:
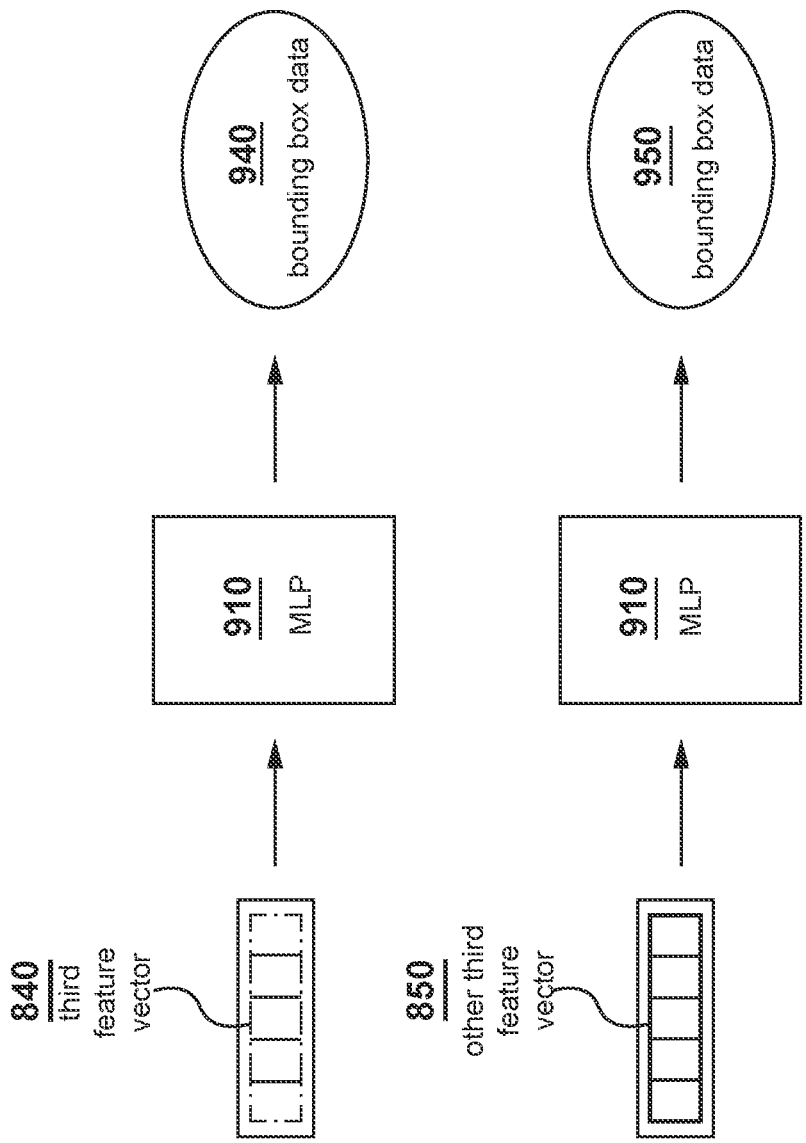
FIG. 9 depicts a detection procedure of FIG. 3, in accordance with at least some non-limiting embodiments of the present technology.

With reference to FIG. 9, there is depicted a representation of how the electronic device 210 may be configured to perform the detection procedure 340. The electronic device 210 is configured to use the third feature vector 840 for generating a bounding box around the respective object associated with the first cluster 540. As seen, the electronic device 210 may be configured to input the third feature vector 840 into a Multi Layer Perceptron (MLP) 910 having been trained to generate bounding box data based on an inputted feature vector. As such, the MLP 910 is configured to process the third feature vector 840 and generate bounding box data 940 representative of a geometry of a first bounding box for detecting the respective object associated with the first cluster 540.

In at least some embodiments of the present technology, the MLP 910 may be trained and implemented in a manner known from aspects disclosed in US Patent Publication no 2020/082560, entitled "ESTIMATING TWO-DIMENSIONAL OBJECT BOUNDING BOX INFORMATION BASED ON BIRD'S-EYE VIEW POINT CLOUD", and published on 12 Mar. 2020, the contents of which is incorporated herein by reference in its entirety.

By the same token, the electronic device 210 is configured to use the other third feature vector 850 for generating a bounding box around the respective object associated with the second cluster 550. As seen, the electronic device 210 may be configured to input the other third feature vector 850 into the MLP 910 is configured to process the other third feature vector 850 and generate bounding box data 950 representative of a geometry of a second bounding box for detecting the respective object associated with the second cluster 550.

In some embodiments of the present technology, the electronic device 210 may be configured to augment the third feature vector 840 with information about the object associated with the second cluster 550. For example, the electronic device 210 may be configured to generate an attention vector as a weighted combination of the third feature vector 840 and of the other third feature vector 850, and where weights are dependent on the third feature vector 840 and the other third feature vector 850. As such, the electronic device 210 may be configured to concatenate the information in the attention vector with the third feature vector, and use the resulting vector as input into the MLP 910 for generating bounding box data 940. So-sharing information amongst third feature vectors may allow increasing the quality of a bounding box generated based on a so-augmented third feature vector.

In other embodiments of the present technology, however, the electronic device 210 may be configured to employ the third feature vector 840 in a manner similar to how the first feature vector 640 is employed by the electronic device 210 for adding information to points from the first cluster 540. In these embodiments, it is contemplated that the electronic device 210 may be configured employ the first NN 610 and the CNN 780 in a "looping configuration" and perform a pre-determined number of iterations where points from the first cluster 540 are iteratively augmented with local and global contexts about the respective object in the surroundings 250 of the vehicle 220.

The pre-determined number of iterations may be selected by an operator of the electronic device based on real-time computational resource limits, and/or for computational speed limits. Developers of the present technology have realized that devising a system where local and global contexts are added iteratively to the point information during respective in-use phases of the first NN and the second NN may generate the feature vector for the object that would increase the accuracy of bounding boxes generated by the MLP 910. In some embodiments, it is contemplated that distinct first NNs and distinct CNNs may be used during two sequential iterations. Also, a single iteration may consist of the electronic device 210 employing a staggered combination of first NNs and the CNNs, without departing from the scope of the present technology.

Developers of the present technology have realized that, due to the "depth" of information about the respective object in the surroundings 250 included in the third feature vector 840, the electronic device 210 is likely to generate similar third feature vectors for the respective object at different moments in time. In at least some aspects of the present technology, this realization may enable and/or ameliorate object tracking capabilities of the electronic device 210.

In some embodiments of the present technology, the electronic device 210 may be configured to (i) generate the third feature vector 840 for a first object at a first moment in time, (ii) and generate an other feature vector for a second object at a second moment in time similarly to how the third feature vector 840 is generated at the first moment in time, and (iii) generate a similarity factor by comparing the third feature vector 840 and the other feature vector. In response to the similarity factor being above a pre-determined threshold, the electronic device 210 may be configured to determine that the first object and the second object are the same object at different moments in time. Such tracking of objects at different moments in time may allow the electronic device to generate kinematic data about the movement of neighboring objects relative to the SDC.

In further embodiments of the present technology, it is contemplated that some points associated with a given object may be erroneously excluded from the first cluster 540. In such cases, once the bounding box data 940 is generated for the given object associated with the first cluster 540, the electronic device 210 may be configured to identify at least one outlier point in the augmented point cloud, and use this at least one outlier point for modifying the bounding box data 940. As such, the electronic device 210 may be configured to generate a modified bounding box for the given object based on the bounding box and the at least one outlier point, and which encompasses not only the first cluster 540 but also the at least one outlier point.

Figure 10:
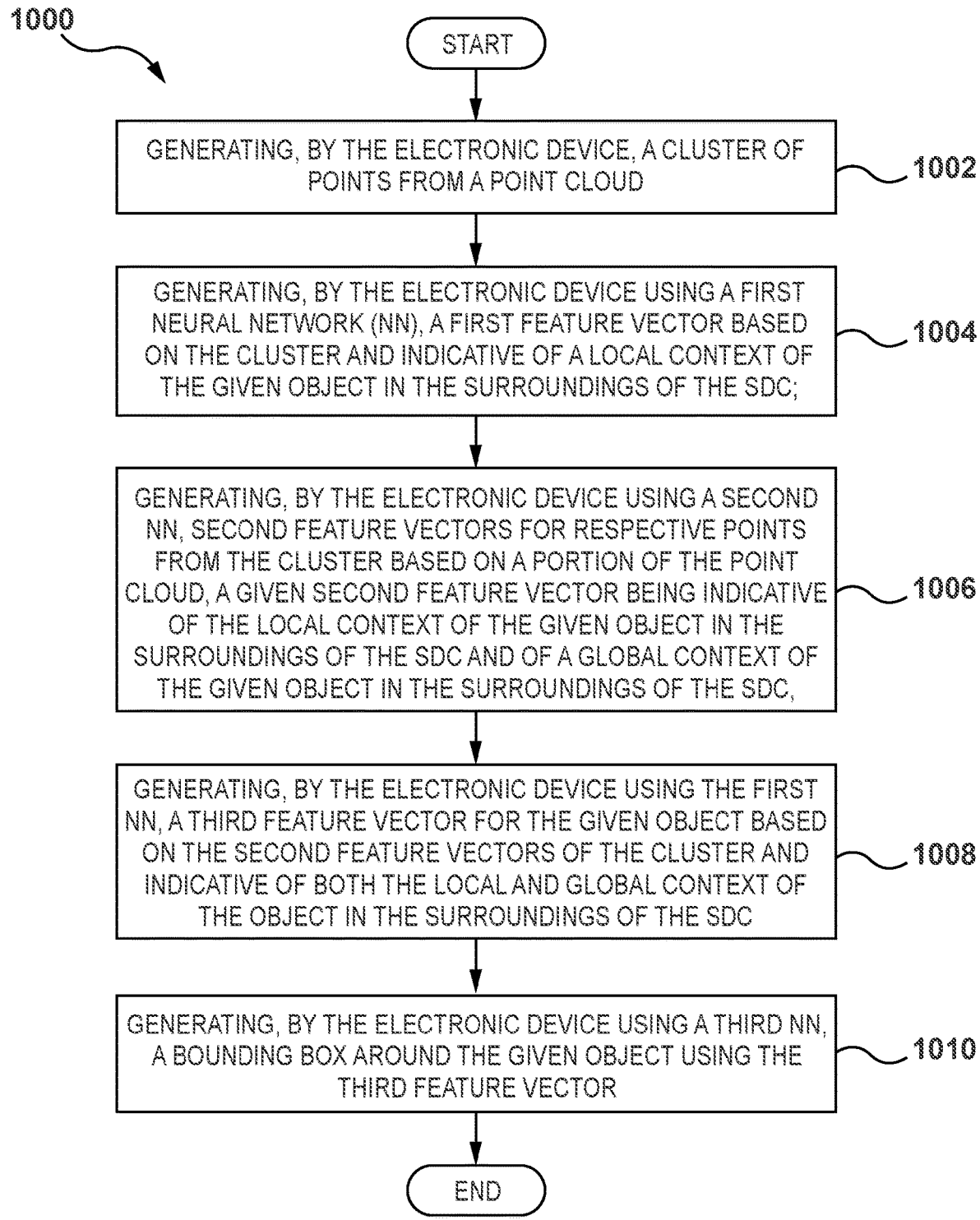
FIG. 10 is a schematic representation of a method performed by the electronic device in accordance with at least some non-limiting embodiments of the present technology.

In some embodiments of the present technology, the electronic device 210 may be configured to execute a computer-implemented method 1000 depicted on FIG. 10.

How the electronic device 210 is configured to perform various steps of the method 100 will now be describe in greater details.

STEP 1002: Generating, by the Electronic Device, a Cluster of Points from a Point Cloud The method 1000 begins at step 1002 with the electronic device 210 configured to generate a given cluster of points from a given point cloud. In some embodiments of the present technology, the electronic device 210 may be configured to perform the cloud augmentation procedure 310 and the cloud clusterization procedure 320 for generating the given cluster.

In one non-limiting example, the electronic device 210 may be configured to generate an augmented point cloud 410 and then may make use of the augmented point cloud 410 for generating the first cluster 540 and the second cluster 550.

In some embodiments, the given point cloud may be an augmented point cloud such that a given augmented point from the augmented point cloud is associated with the location of the given object relative to the vehicle 220 and visual characteristics of the given object.

In some embodiments, as part of the step 1002, the electronic device 210 may be configured to acquire from the LIDAR system 302 point cloud data representative of the point cloud 402 and acquire from the camera system 304 the image data 404 representative of an image of the surroundings of the vehicle 220. The electronic device 210 may also generate using the CNN 406 visual characteristics for respective pixels of the image. The electronic device 210 may also generate the augmented point cloud 410 by projecting the pixels of the image with respective visual characteristics onto corresponding points from the point cloud 402 such that a given augmented point from the augmented point cloud 410 is associated with the location of the given object relative to the vehicle 220 and the visual characteristics of the respective pixel.

In further embodiments, the electronic device 210 may be configured to segment the augmented point cloud 410 into at least two classes of points, and where the at least two classes of points includes an object class. The augmented points of the object class re associated with a given object in the surroundings of the vehicle 220. In some embodiments, the electronic device 210 may perform semantic segmentation of an augmented point cloud for identifying groups of points associated with respective classes of points. The electronic device 210 may also generate distance vectors for the augmented points of the object class. For example, the electronic device 210 may generate distance vectors for the first set of augmented points 510. A given distance vector being representative of an estimated distance of the respective augmented point of the object class from a potential center-point of the given object. It is contemplated that the electronic device 210 may generate modified augmented points of the object class by moving their respective locations in a direction of the respective distance vectors. In one non-limiting example, the electronic device 210 may perform the gravity procedure 326 for generating the modified augmented points of the object class.

In at least some embodiments of the present technology, the electronic device 210 may also execute clustering algorithm onto the modified augmented points for identifying at least one cluster.

STEP 1004: Generating, by the Electronic Device Using a First Neural Network (NN), a First Feature Vector Based on the Cluster and Indicative of a Local Context of the Given Object in the Surroundings of the SDC The method 1000 continues to step 1004 with the electronic device 210 using a given first NN for generating a given first feature vector based on the given cluster from the step 1002. The given first feature vector is indicative of a local context of the respective object in the surroundings of the vehicle 220. In at least some embodiments, the local context may be representative of a geometry of the respective object in the surroundings of the vehicle 220.

In some embodiments, the first NN may be embodied as a PointNet model. It is contemplated that data representative of a given first feature vector may be concatenated with point data associated with a respective point from the given cluster.

STEP 1006: Generating, by the Electronic Device Using a Second NN, Second Feature Vectors for Respective Points from the Cluster Based on a Portion of the Point Cloud, a Given Second Feature Vector Being Indicative of the Local Context of the Given Object in the Surroundings of the SDC and of a Global Context of the Given Object in the Surroundings of the SDC The method 1000 continues to step 1006 with the electronic device 210 configured to use a second given NN for generating given second feature vectors for respective points from the given cluster of the step 1002 based on a portion of the point cloud. A given second feature vector being indicative of the local context of the respective object and of a global context of the respective object in the surroundings of the vehicle 220.

In at least some embodiments of the present technology, the second NN may be the CNN 780 having a receptive field capturing the portion of the point cloud. It is also contemplated that the portion of the point cloud excludes points from the point cloud that are outside the receptive field of the CNN 780. It should be noted that in some embodiments, the global context may be representative of a geometry of other potential objects in the surroundings of the vehicle 220.

STEP 1008: Generating, by the Electronic Device Using the First NN, a Third Feature Vector for the Given Object Based on the Second Feature Vectors of the Cluster and Indicative of Both the Local and Global Context of the Object in the Surroundings of the SDC The method 1000 continues to step 1008 with the electronic device 210 using (again) the first NN for generating a given third feature vector for the respective object based on the second feature vectors of the respective cluster generated by the second NN. The third feature vector is indicative of both the local and global context of the respective object in the surroundings of the vehicle 220.

STEP 1010: Generating, by the Electronic Device Using a Third NN, a Bounding Box Around the Given Object Using the Third Feature Vector The method 1000 continues to step 1010 with the electronic device 210 configured to use a third NN (e.g., MLP) for generating a bounding box around the respective object user the third feature vector generate at step 1008.

In other embodiments of the present technology, however, the electronic device 210 may be configured to employ the third feature vector 840 in a manner similar to how the first feature vector 640 is employed by the electronic device 210 for adding information to points from the first cluster 540. In these embodiments, it is contemplated that the electronic device 210 may be configured employ the first NN 610 and the CNN 780 in a "looping configuration" and perform a pre-determined number of iterations where points from the first cluster 540 are iteratively augmented with local and global contexts about the respective object in the surroundings 250 of the vehicle 220.

The pre-determined number of iterations may be selected by an operator of the electronic device based on real-time computational resource limits, and/or for computational speed limits. Developers of the present technology have realized that devising a system where local and global contexts are added iteratively to the point information during respective in-use phases of the first NN and the second NN may generate the feature vector for the object that would increase the accuracy of bounding boxes generated by the MLP 910. In some embodiments, it is contemplated that distinct first NNs and distinct CNNs may be used during two sequential iterations. Also, a single iteration may consist of the electronic device 210 employing a staggered combination of first NNs and the CNNs, without departing from the scope of the present technology.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

While the above-described implementations have been described and shown with reference to particular steps performed in a particular order, it will be understood that some of these steps may be combined, sub-divided, or re-ordered without departing from the teachings of the present technology. Accordingly, the order and grouping of the steps is not a limitation of the present technology.

The invention claimed is:

1. A method for detecting an object in a surrounding of a Self-Driving Car (SDC), a LIDAR system being mounted onto the SDC and being communicatively coupled to an electronic device, the method comprising:
    generating a cluster of points from a point cloud, the point cloud being representative of the surroundings of the SDC, each point in the cluster being associated with a given object;
    generating, using a first Neural Network (NN), based on points of the point cloud within the cluster, a first feature vector,
        the first feature vector being associated with each point from the cluster and being indicative of a local context of the given object in the surroundings of the SDC;
    augmenting each point of the cluster with the first feature vector, thereby generating an augmented cluster;
    generating, using a second NN, second feature vectors for respective points from the augmented cluster based on a portion of the point cloud, the portion including the points from the augmented cluster and other points from the point cloud that are in proximity to the augmented cluster,
        a given second feature vector of the respective point from the augmented cluster being indicative of the local context of the given object in the surroundings of the SDC and of a global context of the given object in the surroundings of the SDC,
    generating, using the first NN, a third feature vector for the given object based on the second feature vectors of the augmented cluster,
        the third feature vector being representative of the given object in the surroundings of the SDC and being indicative of both the local and global context of the object in the surroundings of the SDC; and
    generating, using a third NN, a bounding box around the given object using the third feature vector.

2. The method of claim 1, wherein the point cloud is an augmented point cloud such that a given augmented point from the augmented point cloud is associated with the location of the given object relative to the SDC and visual characteristics of the given object.

3. The method of claim 1, wherein the generating the cluster of points based on the point cloud comprises:
    acquiring, from the LIDAR system, point cloud data representative of the point cloud;
    acquiring, from a camera system, image data representative of an image of the surroundings of the SDC;
    generating employing a fourth NN, visual characteristics for respective pixels of the image;
    generating an augmented point cloud by projecting the pixels of the image with respective visual characteristics onto corresponding points from the point cloud,
        such that a given augmented point from the augmented point cloud is associated with the location of the given object relative to the SDC and the visual characteristics of the respective pixel;
    generating the cluster of points based on the augmented point cloud.

4. The method of claim 3, wherein the generating the cluster of points based on the augmented point cloud comprises:
    segmenting the augmented point cloud into at least two classes of points, the at least two classes of points includes an object class,
        the augmented points of the object class being associated with a given object in the surroundings of the SDC;
    generating distance vectors for the augmented points of the object class, a given distance vector being representative of an estimated distance of the respective augmented point of the object class from a potential center-point of the given object;
    generating modified augmented points of the object class by moving their respective locations in a direction of the respective distance vectors; and
    executing a clustering algorithm onto the modified augmented points for identifying the cluster.

5. The method of claim 1, wherein the local context is representative of a geometry of the given object in the surroundings of the SDC.

6. The method of claim 1, wherein the second NN has a receptive field capturing the portion of the point cloud.

7. The method of claim 6, wherein the portion of the point cloud excludes points from the point cloud that are outside the receptive field of the second NN.

8. The method of claim 1, wherein the global context is representative of a geometry of other potential objects in the surroundings of the SDC.

9. The method of claim 1, wherein the generating the bounding box comprises:
    generating, using the first NN, a fourth feature vector based on the augmented cluster of points and the third feature vector, the fourth feature vector being associated with each point from the augmented cluster;
    generating, using the second NN, fifth feature vectors for respective points from the augmented cluster based on the portion of the point cloud, the portion including the points from the augmented cluster and other points from the point cloud that are in proximity to the augmented cluster,
    generating, using the first NN, a sixth feature vector for the given object based on the fifth feature vectors of the augmented cluster; and generating, using the third NN, the bounding box around the given object using the sixth feature vector instead of the third feature vector.

10. The method of claim 1, wherein the generating the third feature vector for the given object is performed at a first moment in time, and wherein the method further comprises:
generating, using the first NN, an other third feature vector for an other given object at a second moment in time;
generating a similarity feature by comparing the third feature vector with the other third feature vector;
in response to the similarity feature being above a predetermined threshold:
determining that the given object at the first moment in time and the other given object at the second moment in time is a same object; and
generating kinematic data for the same object based on a location of the bounding box generated based on the third feature vector at the first moment in time and a location of an other bounding box generated based on the other third feature vector at the second moment in time.

11. The method of claim 1, wherein the method further comprises:
identifying at least one outlier point in the point cloud, the outlier point belonging to the given object and excluded from the augmented cluster; and
generating a modified bounding box for the given object based on the bounding box and the at least one outlier point.

12. An electronic device for detecting an object in a surrounding of a Self-Driving Car (SDC), a LIDAR system being mounted onto the SDC and being communicatively coupled to the electronic device, the electronic device comprising at least one processor and at least one non-transitory computer-readable memory storing executable instructions, which, when executed by the at least one processor, cause the electronic device to:
generate a cluster of points from a point cloud, the point cloud being representative of the surroundings of the SDC, each point in the cluster being associated with a given object;
generate, by using a first Neural Network (NN), a first feature vector based on the cluster,
the first feature vector being associated with each point from the cluster and being indicative of a local context of the given object in the surroundings of the SDC;
augment each point of the cluster with the first feature vector, thereby generating an augmented cluster;
generate, by using a second NN, second feature vectors for respective points from the augmented cluster based on a portion of the point cloud, the portion including the points from the augmented cluster and other points from the point cloud that are in proximity to the cluster, a given second feature vector of the respective point from the augmented cluster being indicative of the local context of the given object in the surroundings of the SDC and of a global context of the given object in the surroundings of the SDC,
generate, by using the first NN, a third feature vector for the given object based on the second feature vectors of the augmented cluster,
the third feature vector being representative of the given object in the surroundings of the SDC and being indicative of both the local and global context of the object in the surroundings of the SDC; and
generate, by using a third NN, a bounding box around the given object using the third feature vector.

13. The electronic device of claim 12, wherein the point cloud is an augmented point cloud such that a given augmented point from the augmented point cloud is associated with the location of the given object relative to the SDC and visual characteristics of the given object.

14. The electronic device of claim 12, wherein the at least one processor further causes the electronic device to generate the cluster of points based on the point cloud comprises the electronic device configured to:
acquire from the LIDAR system, point cloud data representative of the point cloud;
acquire from a camera system, image data representative of an image of the surroundings of the SDC;
generate by employing a fourth NN, visual characteristics for respective pixels of the image;
generate an augmented point cloud by projecting the pixels of the image with respective visual characteristics onto corresponding points from the point cloud,
such that a given augmented point from the augmented point cloud is associated with the location of the given object relative to the SDC and the visual characteristics of the respective pixel;
generate the cluster of points based on the augmented point cloud.

15. The electronic device of claim 14, wherein to generate the cluster of points based on the augmented point cloud, the at least one processor causes the electronic device to:
segment the augmented point cloud into at least two classes of points, the at least two classes of points includes an object class,
the augmented points of the object class being associated with a given object in the surroundings of the SDC;
generate distance vectors for the augmented points of the object class, a given distance vector being representative of an estimated distance of the respective augmented point of the object class from a potential center-point of the given object;
generate modified augmented points of the object class by moving their respective locations in a direction of the respective distance vectors; and
execute a clustering algorithm onto the modified augmented points for identifying the cluster.

16. The electronic device of claim 12, wherein the second NN has a receptive field capturing the portion of the point cloud.

17. The electronic device of claim 16, wherein the portion of the point cloud excludes points from the point cloud that are outside the receptive field of the second NN.

18. The electronic device of claim 12, wherein to generate the bounding box, the at least one processor causes the electronic device to:
generate, by using the first NN, a fourth feature vector based on the augmented cluster of points and the third feature vector, the fourth feature vector being associated with each point from the augmented cluster;
generate, by using the second NN, fifth feature vectors for respective points from the augmented cluster based on the portion of the point cloud, the portion including the points from the augmented cluster and other points from the point cloud that are in proximity to the augmented cluster,
generate, by using the first NN, a sixth feature vector for the given object based on the fifth feature vectors of the augmented cluster; and generate, by using the third NN, the bounding box around the given object using the sixth feature vector instead of the third feature vector.

19. The electronic device of claim 12, wherein the at least one processor causes the electronic device to generate the third feature vector for the given object at a first moment in time, and wherein the at least one processor further causes the electronic device to:
- generate by using the first NN, an other third feature vector for an other given object at a second moment in time;
- generate a similarity feature by comparing the third feature vector with the other third feature vector;
- in response to the similarity feature being above a predetermined threshold:
- determine that the given object at the first moment in time and the other given object at the second moment in time is a same object; and
- generate kinematic data for the same object based on a location of the bounding box generated based on the third feature vector at the first moment in time and a location of an other bounding box generated based on the other third feature vector at the second moment in time.

20. The electronic device of claim 12, wherein the at least one processor further causes the electronic device to:
- identify at least one outlier point in the point cloud, the outlier point belonging to the given object and excluded from the augmented cluster; and
- generate a modified bounding box for the given object based on the bounding box and the at least one outlier point.

* * * * *